(12) United States Patent
Inada

(10) Patent No.: US 8,615,603 B2
(45) Date of Patent: Dec. 24, 2013

(54) WIRELESS LAN SYSTEM, WIRELESS LAN DEVICE, AND STORAGE MEDIUM HAVING STORED THEREIN WIRELESS LAN PROGRAM

(75) Inventor: Tetsuya Inada, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 294 days.

(21) Appl. No.: 13/032,647

(22) Filed: Feb. 23, 2011

(65) Prior Publication Data

US 2011/0205956 A1  Aug. 25, 2011

(30) Foreign Application Priority Data

Feb. 24, 2010  (JP) ................... 2010-038744

(51) Int. Cl.
  *G06F 15/173* (2006.01)
(52) U.S. Cl.
  USPC ........................................................ 709/240
(58) Field of Classification Search
  None
  See application file for complete search history.

(56) References Cited

U.S. PATENT DOCUMENTS

| | | | | |
|---|---|---|---|---|
| 6,580,700 | B1 * | 6/2003 | Pinard et al. .................. | 370/332 |
| 8,325,922 | B1 * | 12/2012 | Sun et al. ...................... | 380/270 |
| 2006/0268796 | A1 * | 11/2006 | Watanabe et al. ............. | 370/338 |
| 2007/0058190 | A1 * | 3/2007 | Harumichi ................... | 358/1.13 |
| 2007/0104168 | A1 * | 5/2007 | Polson .......................... | 370/338 |
| 2011/0007637 | A1 * | 1/2011 | Chen et al. .................... | 370/252 |

FOREIGN PATENT DOCUMENTS

| | | |
|---|---|---|
| CN | 1430452 A | 7/2003 |
| JP | 2003-258719 A | 9/2003 |
| JP | 2005-523641 A | 8/2005 |
| JP | 2008-236505 A | 10/2008 |
| JP | 2009-303170 A | 12/2009 |
| JP | 2010-011084 A | 1/2010 |
| JP | 4977271 B2 | 4/2012 |

OTHER PUBLICATIONS

Speicher et al. Fast MAC-Layer Scanning in IEEE 802.11 Fixed Relay Radio Access Networks. 2006. IEEE.*
Chinese Office Action Issued May 30, 2013 in Patent Application No. 201110044867.3 (English translation only).

* cited by examiner

*Primary Examiner* — Joseph Avellino
*Assistant Examiner* — Tsung Wu
(74) *Attorney, Agent, or Firm* — Oblon, Spivak, McClelland, Maier & Neustadt, L.L.P.

(57) ABSTRACT

A wireless LAN device and a wireless LAN system including three or more wireless LAN devices are provided. A wireless LAN device includes a wireless communication section for performing wireless communication so as to relay a packet in a wireless network. The wireless communication section includes a priority transmitting section for transmitting a priority level of the wireless LAN device to one or more other wireless LAN devices; a priority receiving section for receiving a priority level of the one or more other wireless LAN devices from the one or more other wireless LAN devices, and storing the received priority level in a priority storing section; and a relaying section for relaying the packet to the one or more other wireless LAN devices that has the highest priority level among the priority levels stored in the priority storing section.

17 Claims, 11 Drawing Sheets

WIRELESS LAN SYSTEM, WIRELESS LAN DEVICE, AND STORAGE MEDIUM HAVING STORED THEREIN WIRELESS LAN PROGRAM

CROSS REFERENCE TO RELATED APPLICATION

The disclosure of Japanese Patent Application No. 2010-038744 filed on Feb. 24, 2010 is incorporated herein by reference.

BACKGROUND OF THE INVENTION

1. Field of the Invention

The present invention relates to a wireless LAN device performing wireless communication in a wireless network.

2. Description of the Background Art

A wireless Local Area Network (LAN) is becoming popular in recent years. The wireless LAN enables communication only within a range where radio waves of wireless LAN devices are reachable. Thus, for communication in an area wider than a range where radio waves of a wireless LAN device are reachable, a relaying technique is being developed, in which the communicable area is broadened by arranging a plurality of wireless relay devices. For example, Japanese Unexamined Patent Publication No. JP2005-523641 discloses a technique to enable a wireless terminal (a wireless LAN device that start communication with another terminal such as a server) to access an outer network via a wireless relay device and a gateway connected to an outer network.

However, which wireless relay devices are to be connected is manually determined by the user, which bothers the user. If several wireless relay devices having the same wireless setting are present, the level of the Received Signal Strength Indicator (RSSI) may be used to automatically determine which one of the wireless relay devices is to be connected. In this case, however, it sometimes occurs that an optimized relay path composed of the minimum number of relay points cannot be determined.

In consideration of one or more of the above-described problems, according to an aspect of the present invention, an efficient relay path composed of wireless relay devices for access to an outer network via a wireless LAN is automatically established.

SUMMARY OF THE INVENTION

Objects of the present invention are to solve at least some of the above-described problems, and to automatically set an efficient relay path composed of wireless relay devices.

To attain the above objects, the present invention includes the following features. A first aspect of the present invention is a wireless LAN system comprising: three or more wireless LAN devices for performing wireless communication in a wireless network. At least one of the wireless LAN devices comprises: a non-transitory information recording medium having stored therein a program containing a wired communication section and a determination section, each executable by a processor. The wired communication section, when executed by the processor, performs wired communication with an outer network; and the determination section, when executed by the processor, determines whether the at least one wireless LAN device is connected to the outer network. The wireless LAN devices each comprises: a non-transitory information recording medium having stored therein a program containing a wireless communication section, a priority setting section, and a priority storing section, each executable by a processor. The wireless communication section, when executed by the processor, performs wireless communication including relaying a packet in the wireless network; the priority setting section, when executed by the processor, sets a priority level of the wireless LAN device as a relay destination in a relay path along which the packet travels during transmission through the wireless network to the outer network, the priority setting section setting the priority level of the wireless LAN device to be relatively higher if the determination section determines that the wireless LAN device is connected to the outer network; and the priority storing section, when executed by the processor, stores priority level of one or more of the other wireless LAN devices. The wireless communication section comprises: a priority transmitting section for transmitting the priority level of the wireless LAN device set by the priority setting section to the one or more other wireless LAN devices; a priority receiving section for receiving the priority levels of the one or more other wireless LAN devices from the one or more other wireless LAN devices, and storing the received priority level in the priority storing section; and a relaying section for relaying the packet to the one or more other wireless LAN devices that has the highest priority level among the priority levels stored in the priority storing section.

In a further aspect, when the determination section determines that the wireless LAN device is not connected to the outer network, the priority setting section may set the priority level of the wireless LAN device based on the priority level of the one or more other wireless LAN devices.

In a further aspect, if the one or more other wireless LAN devices comprises a plurality of other wireless LAN devices and at least one of the priority levels of the plurality of other wireless LAN devices stored in the priority storing section is not a lowest priority level among number of priority levels employed in the wireless LAN system, the priority setting section sets the priority level of the wireless LAN device to be one level lower than the highest priority level of the priority levels stored in the priority storing section.

In a further aspect, if the one or more other wireless LAN devices comprises a single other wireless LAN device and the priority level of the single other wireless LAN device is not a lowest priority level among number of priority levels employed in the wireless LAN system, the priority setting section sets the priority level of the wireless LAN device to be one level lower than the priority level stored in the priority storing section.

In a further aspect, if the priority levels of all of the one or more other wireless LAN devices stored in the priority section are a lowest priority level among number of priority levels employed in the wireless LAN system, the priority setting section sets the priority level of the wireless LAN device to be a lowest priority level among number of priority levels employed in the wireless LAN system.

In a further aspect, when the wireless communication section has established a predetermined connection with one of the one or more other wireless LAN devices, the priority setting section may prohibit setting of a new priority level.

In a further aspect, the priority transmitting section may include the set priority level into a management frame communicated over the wireless network thereby to transmit the priority level to the one or more other wireless LAN devices.

In a further aspect, the wireless communication section may further includes an authenticated connection section for performing an infrastructure mode-compliant authentication process, based on a request from the wireless LAN device to one or more superordinate other wireless LAN devices, which have the highest priority level among one or more other wireless LAN devices, the one or more other wireless LAN devices being present in a range where radio waves of the wireless LAN device are reachable, and being communicable with the wireless LAN device, and for establishing a connection with the one or more superordinate other wireless LAN devices that have been authenticated, and the relaying section relays the packet to the one or more superordinate other wireless LAN devices connected by the authenticated connection section.

In a further aspect, if there are a plurality of the superordinate other wireless LAN devices, the authenticated connection section may establish the connection through the authentication with one of the plurality of the superordinate other wireless LAN devices that has the highest priority level and that has the highest signal strength.

In a further aspect, the wireless communication section may further include a rank setting section for obtaining, from the one or more other wireless LAN devices, first identification information for identifying the one or more other wireless LAN devices, and for setting a rank for establishing the connection through the authentication between the wireless LAN device and one of the one or more other wireless LAN devices, based on the first identification information and second identification information which is stored in the wireless LAN device to identify the wireless LAN device. If the priority level set to the wireless LAN device is the same as the priority level set to the one or more other wireless LAN devices, the authenticated connection section may establish the connection through the authentication with one of the one or more other wireless LAN devices based on the rank set by the rank setting section. The relaying section may perform relaying to the one of the more or more other wireless LAN connection devices with which the connection has been established by the authenticated connection section.

In a further aspect, the authenticated connection section may be configured to perform exchange of encryption keys for encrypting the packet. The relaying section may relay through encrypted communication using the encryption keys which are exchanged by the authenticated connection section.

In a further aspect, the wireless communication section is configured to perform wireless communication using a plurality of channels. The priority transmitting section may further include: a requesting section for transmitting a probe request having assigned thereto original channel information indicating a channel being originally used, the requesting section transmitting the probe request by using a channel of the plurality of channels that is different from the originally used channel; a responding section for transmitting a probe response, upon reception of a probe request from one of the one or more other wireless LAN devices, which probe request from the one of the one or more other wireless LAN devices has assigned thereto other wireless LAN device channel information, the responding section transmitting the probe response by using the channel indicated by the other wireless LAN device channel information assigned to the probe request from the one of the one or more other wireless LAN devices; and a post-request restoring section for restoring, within a predetermined period of time after transmission of the probe request having assigned thereto the original channel information, the originally used channel.

A second aspect of the present invention is a wireless LAN device which perform wireless communication in a wireless network. The wireless LAN device comprises a non-transitory information recording medium having stored therein a program containing a wired communication section, a determination section, a wireless communication section, a priority setting section, and a priority storing section, each executable by a processor. The wired communication section, when executed by the processor, performs wired communication with an outer network; the determination section, when executed by the processor, determines whether the wireless LAN device is connected to the outer network; the wireless communication section, when executed by the processor, performs wireless communication including relaying a packet in the wireless network; the priority setting section, when executed by the processor, sets a priority level of the wireless LAN device as a relay destination in a relay path along which the packet travels during transmission through the wireless network to the outer network, the priority setting section setting the priority level of the wireless LAN device to be relatively higher if the determination section determines that the wireless LAN device is connected to the outer network; and a priority storing section, when executed by the processor, storing priority levels of one or more other wireless LAN devices which are present in a range where radio waves of the wireless LAN device are reachable and which are capable of communicating with the wireless LAN device. The wireless communication section comprises: a priority transmitting section for transmitting the priority level of the wireless LAN device set by the priority setting section to the one or more other wireless LAN devices; a priority receiving section for receiving the priority levels of the one or more other wireless LAN devices from the one or more other wireless LAN devices, and storing the received priority levels in the priority storing section; and a relaying section for relaying the packet to the one or more the other wireless LAN devices that has the highest priority level among the priority levels stored in the priority storing section.

A third aspect of present invention is a non-transitory storage medium having stored therein a program for causing relay of a packet between a wireless LAN device, which performs wired communication with an outer network and is capable of relaying a packet in a wireless network, and one or more other wireless LAN devices. The program causes a processor provided to the wireless LAN device to perform: a determination function for determining whether the wireless LAN device is connected to the outer network; a priority setting function for setting a priority level of the wireless LAN device as a relay destination in a relay path along which the packet travels during transmission through the wireless network to the outer network, the priority setting function setting the priority level of the wireless LAN device to be relatively higher if the determination function determines that the wireless LAN device is connected to the outer network; a transmitting function for transmitting the set priority level of the one or more other wireless LAN devices; a receiving function for receiving from the one or more other wireless LAN devices, the priority levels of the one or more other wireless LAN devices; and a relay function for relaying the packet to the one or more of the other wireless LAN devices that has the highest priority level.

A fourth aspect of the present invention is a method for allowing a wireless LAN device, which performs wired communication with an outer network and is configured to relay a packet in a wireless network, to relay the packet to one or more other wireless LAN devices. The method comprises: determining whether the wireless LAN device is connected to the outer network; setting a priority level of the wireless LAN device as a relay destination in a relay path along which the packet travels during transmission through the wireless network to the outer network, the priority level of be wireless LAN device being set to be relatively higher if the wireless LAN device is connected to the outer network; transmitting the set priority level to the one or more other wireless LAN devices; receiving priority levels of the one or more other wireless LAN devices from the one or more other wireless LAN devices; and relaying the packet to the one or more other wireless LAN devices that has the highest priority level.

The wireless LAN system and the wireless LAN devices of the present invention enable setting of the priority levels of the wireless LAN devices so as to set the highest priority level to one of the wireless LAN devices that is connected to an outer network, and to set hierarchically the priority levels of the other wireless LAN devices that are not connected to the outer network in accordance with the number of relay points to one of the wireless LAN devices connected to the outer network. Accordingly, the wireless LAN system, the wireless LAN devices, and the relay path composed of the wireless LAN devices of the present invention can be established automatically efficiently.

DESCRIPTION OF THE PREFERRED EMBODIMENTS

Figure 1:
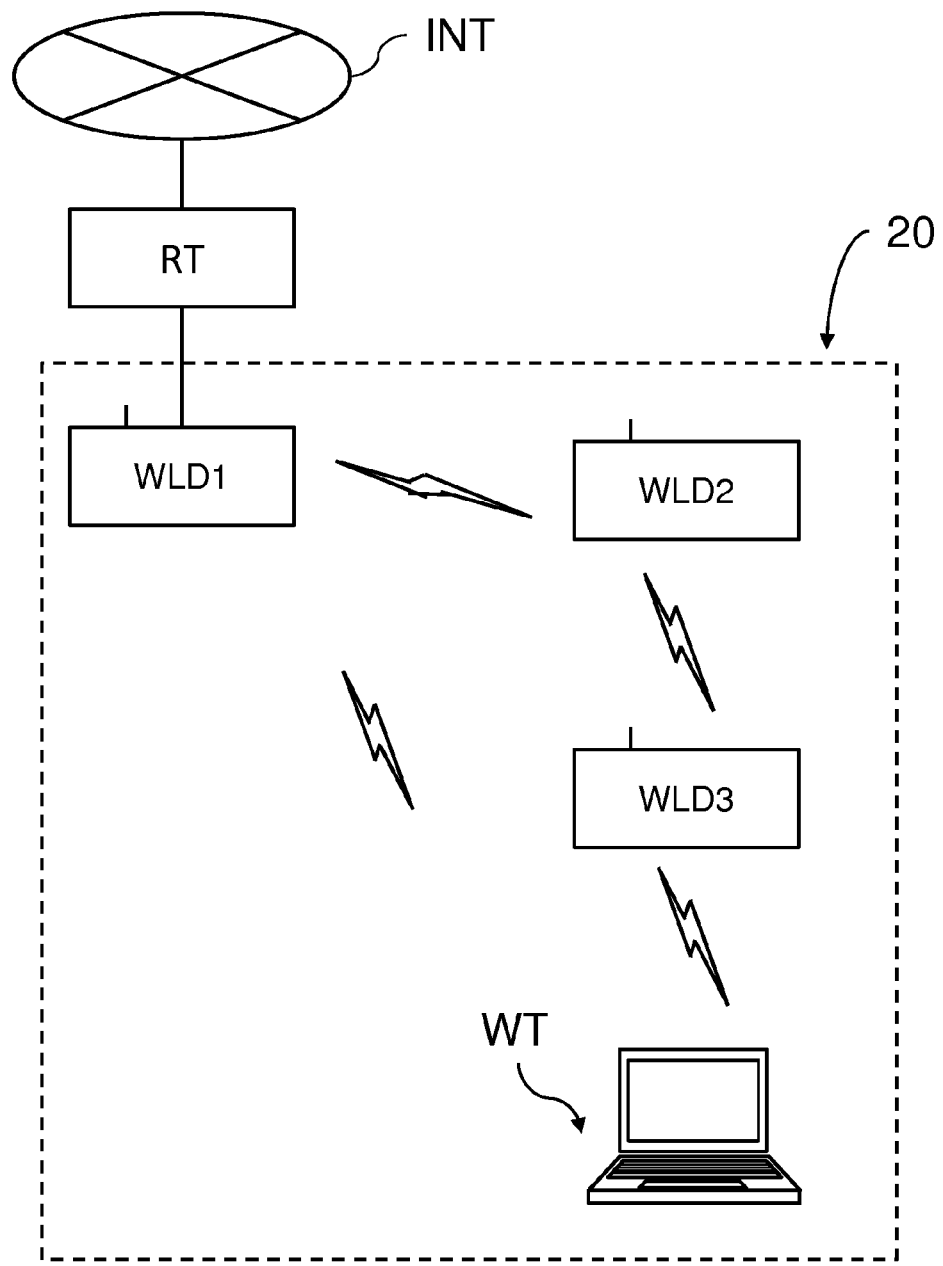
FIG. 1 is a diagram illustrating a schematic configuration of a wireless LAN system according to an embodiment of the present invention.

Hereinafter, an embodiment of the present invention will be described in detail with reference to the accompanying drawings. FIG. 1 is a diagram illustrating a schematic configuration of a wireless LAN system 20 according to the embodiment of the present invention. As shown in the diagram, the wireless LAN system 20 includes three wireless LAN devices WLD1 to WLD3 and a wireless terminal WT. Alternatively, the system 20 may includes more than three wireless LAN devices, if necessary. The wireless LAN devices WLD1 to WLD3 and the wireless terminal WT included in the wireless LAN system 20 of this embodiment are wireless LAN devices which are compliant with the Institute of Electrical and Electronics Engineers (IEEE) 802.11 standard, and have preliminarily set thereto the same Extended Service Set Identifier (ESSID) and wireless encryption. In this embodiment, the wireless LAN devices WLD1 to WLD3 have the same configuration, and each have a bridge function to connect a wired LAN and the corresponding wireless LAN, and a Wireless Distribution System (WDS) function to relay packets between wireless LAN devices.

Of the wireless LAN devices WLD1 to WLD3, the wireless LAN device WLD1 is wiredly connected to an outer network, for example, the internet INT via a router RT. The wireless LAN device WLD1 may be connected to any suitable outer network, and thus it may be connected to, for example, a Wide Area Network (WAN) instead of the internet INT. In this embodiment, the router RT has a gateway function and a Dynamic Host Configuration Protocol (DHCP) function.

The wireless LAN devices WLD1 to WLD3 are set in a range where their radio waves are reachable to one another, and thereby mutual communication among them is realized. As shown in FIG. 1, the wireless LAN devices WLD1 to WLD3 are set such that the WLD2 is set closer to the wireless LAN device WLD3 than is the wireless LAN device WLD1. The wireless LAN devices WLD1 to WLD3 will be described later in detail.

The wireless terminal WT, in this embodiment, is a general-purpose personal processor including a wireless LAN card or incorporating a wireless LAN module, and is capable of communicating with other terminals (not shown) via the wireless LAN devices WLD1 to WLD3. Further, the wireless terminal WT is capable of accessing the internet INT via the wireless LAN devices WLD1 to WLD3. For example, in this embodiment, the wireless terminal WT can access the internet INT through a relay path composed of the wireless LAN devices WLD3, WLD2, and WLD1 in this order, or through a relay path composed of the wireless LAN device WLD3 and WLD1 in this order. Of course there may be a plurality of wireless terminals WT connected to the wireless LAN device WLD3. In addition, any desirable number of wireless terminals may be connected to the wireless LAN devices WLD1 and WLD2.

Figure 2:
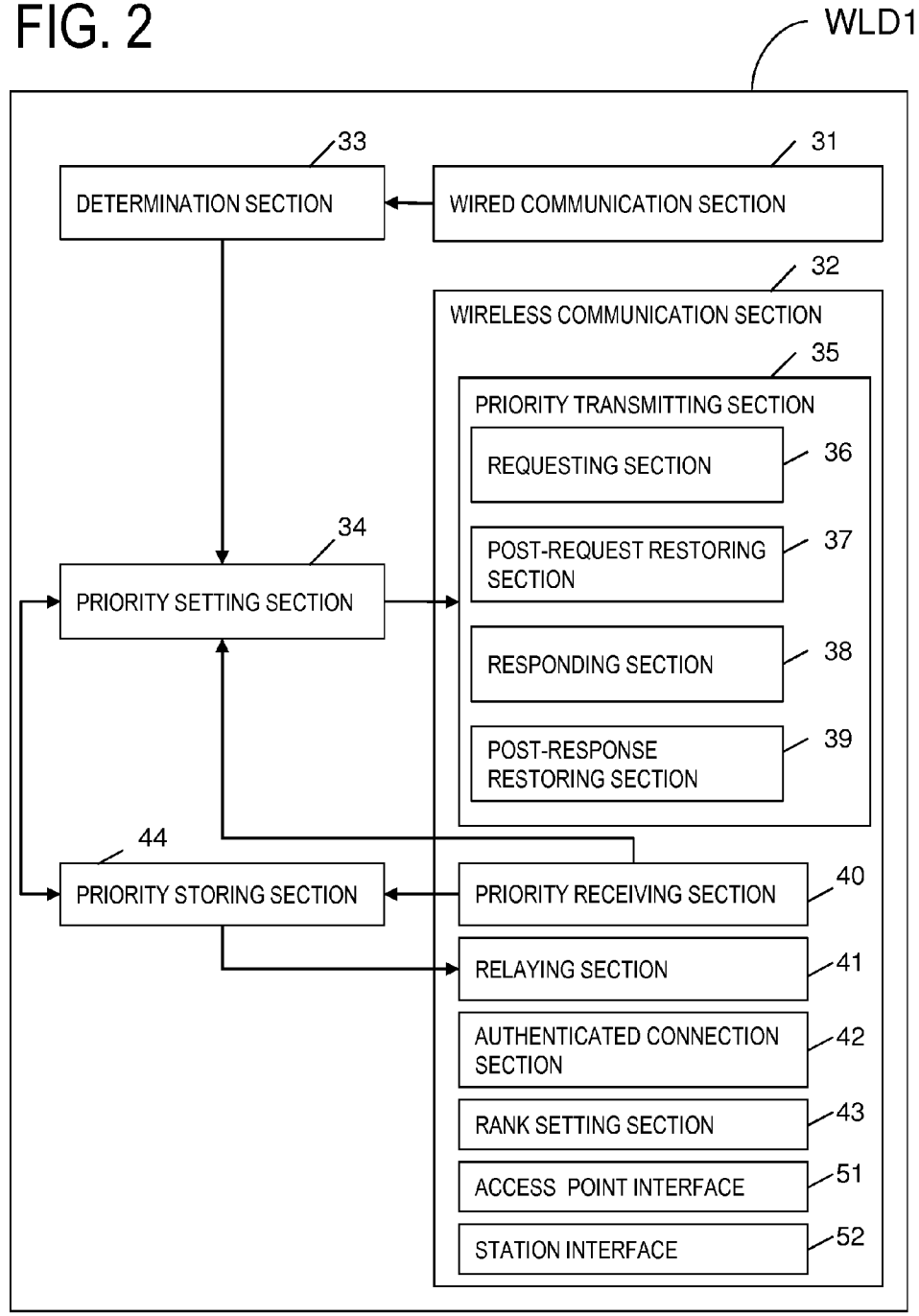
FIG. 2 is a block diagram illustrating a schematic configuration of a wireless LAN device according to this embodiment.

FIG. 2 shows a schematic configuration of the wireless LAN device WLD1 typifying the wireless LAN devices WLD1 to WLD3 which have the same configuration. As shown in the figure, the wireless LAN device WLD1 includes a wired communication section 31, a wireless communication section 32, a determination section 33, a priority setting section 34, and a priority storing section 44. The wireless communication section 32 includes a priority transmitting section 35, a priority receiving section 40, a relaying section 41, an authenticated connection section 42, and a rank setting section 43. Further, the priority transmitting section 35 includes a requesting section 36, a post-request restoring section 37, a responding section 38, and a post-response restoring section 39.

The wired communication section 31 has an interface for connection to a wired LAN, and is connected to a router RT via a cable. The wireless communication section 32 has interfaces for wireless communication, which enable the wireless LAN device to functions as an access point as well as a station. That is, the wireless communication section 32 includes an access point interface 51 and a station interface 52. The access point interface 51 functions as an access point (hereinafter simply referred to as an access point), and receives a packet from a wireless station (hereinafter simply referred to as a station). The station interface 52 functions as a station, and transmits a packet to an access point. The access point interface 51 and the station interface 52 are mounted in the wireless LAN device WLD1 such that the wireless LAN device WLD1 can receive radio waves from the outside and transmit radio waves to the outside. The access point interface 51 and the station interface 52 may be configured as a single wireless module, or as different modules.

The determination section 33 determines whether the wired communication section 31 is connected to an outer network (e.g., internet INT) via the router RT. The priority setting section 34 sets the priority (priority level as a relay destination) of the wireless LAN device WLD1 in a relay path for a packet to be transmitted from the wireless LAN system 20 to the outer network (e.g. internet INT). The priority setting section 34 refers to the result of the determination by the determination section 33, and sets the priority level relatively higher when the wired communication section 31 is connected to the outer network. Operation of the priority setting section 34 will be described later in detail.

The priority storing section 44 stores therein priority levels, and associates the priority levels with respective identification information, e.g., MAC addresses, of the wireless LAN devices WLD1 to WLD3. The priority levels are stored in the priority storing section 44 and are set by the priority setting process to be described later.

The priority transmitting section 35 transmits the priority level set by the priority setting section 34 to the other wireless LAN devices WLD2 and WLD3 that are present in a range where radio waves from the wireless LAN device WLD1 are reachable. The priority receiving section 40 receives priority levels of the wireless LAN devices WLD2 and WLD3 transmitted from the other wireless LAN devices WLD2 and WLD3. The priority receiving section 40 stores the received priority levels in the priority storing section 44 while associating the priority levels with the respective identification information of the wireless LAN devices WLD1 to WLD3.

Referring to the priority levels stored in the priority storing section 44, the relaying section 41 of the wireless LAN device WLD1 relays the packet directed to the outer network (e.g. internet INT) to one of the other wireless LAN devices WLD2 or WLD3, that has the highest priority level (hereinafter, referred to as an superordinate wireless LAN devices). The authenticated connection section 42 performs authentication of the other wireless LAN device WLD2 or WLD3 having the highest priority level in compliance with an infrastructure mode, and establishes a connection with the other wireless LAN device WLD2 or WLD3 having the highest priority level. The rank setting section 43 sets a rank to establish an access point/station connection relation, if the priority level of the wireless LAN device WLD1 is the same as the priority level of the other wireless LAN device WLD2 or WLD3 having the highest priority level. Operations of the authenticated connection section 42 and rank setting section 43 will be described later in detail.

The requesting section 36 included in the priority transmitting section 35 transmits a probe request having assigned thereto channel information indicating a channel being originally used. The requesting section 36 transmits the probe request by using a channel that is different from the originally used channel. The post-request restoring section 37 restores the channel, within a predetermined period of time after transmission of the probe request, to the originally used channel. The responding section 38 uses a channel assigned to a probe request to transmit a probe response including a priority level to the another wireless LAN device WLD2 or WLD3 upon reception of the probe request transmitted by the another wireless LAN device WLD2 or WLD3. If a probe response is transmitted using a channel assigned to the probe request transmitted by the another wireless LAN device WLD2 or WLD3 as changed from the channel originally used by the responding section 38, the post-response restoring section 39 restores the channel, within a predetermined period of time after transmission of the probe response, to the originally used channel. Operations of the requesting section 36, the post-request restoring section 37, the responding section 38, and the post-response restoring section 39 will be described later in detail.

Figure 3:
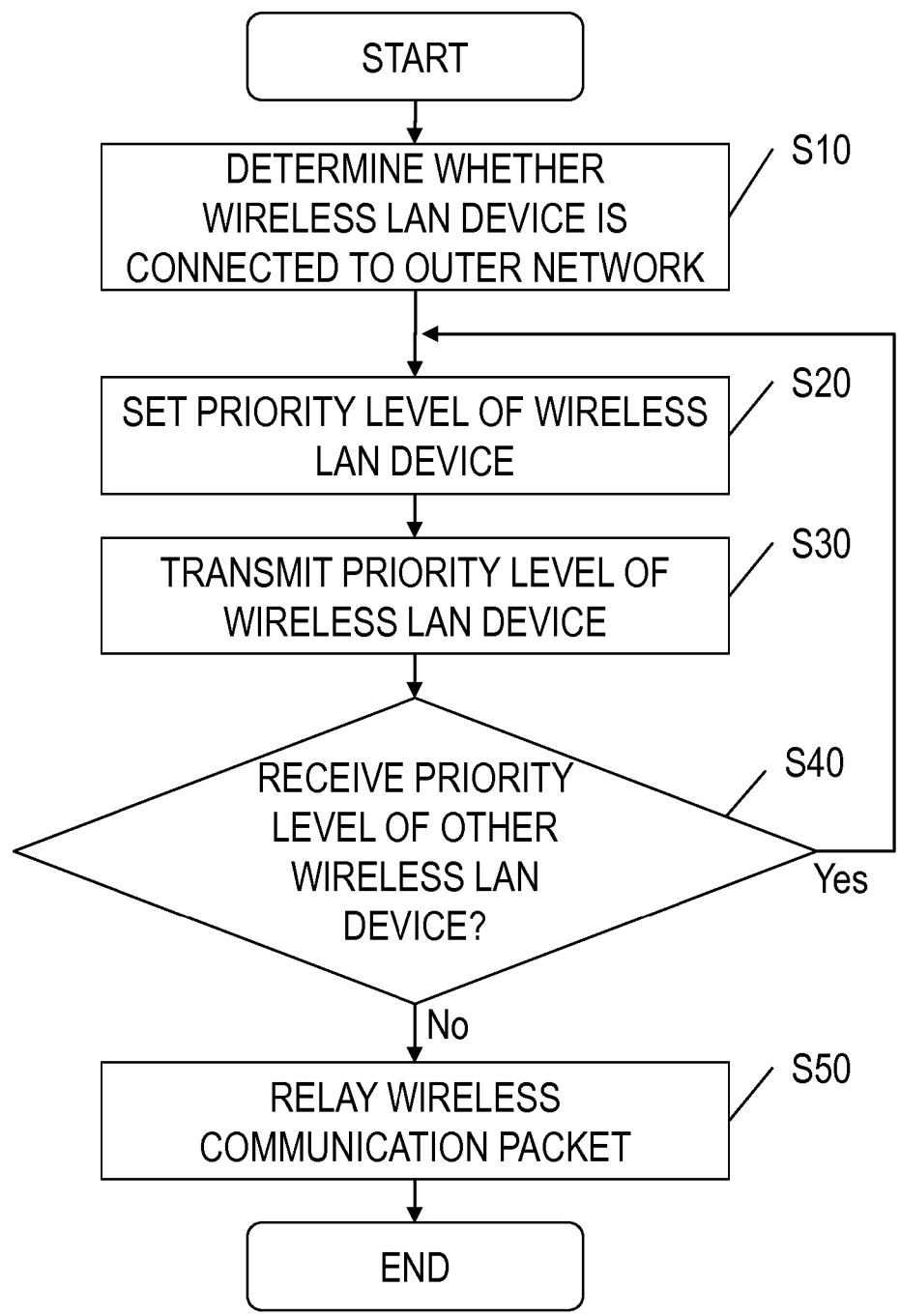
FIG. 3 is a flowchart showing a flow of the processes performed by the wireless LAN device according to this embodiment.

Next, an outline of the operation of a wireless LAN device according to this embodiment will be described in detail with reference to the drawings. FIG. 3 is a flowchart showing a flow of the processes performed by a wireless LAN device. To begin with, the determination section 33 utilizes the wired communication section 31 to determine whether the wireless LAN device is connected to an outer network (e.g., internet INT in the case of the example in FIG. 1) (S10). Next, the priority setting section 34 sets the priority level of the wireless LAN device based on the determination result by the determination section 33 and on the information on the priority levels of other wireless LAN devices. If the priority setting section 34 determines that the wireless LAN device is connected to an outer network, the priority setting section 34 sets the priority level of the wireless LAN device to be higher (S20). Next, the priority transmitting section 35 transmits the set priority level to the other wireless LAN devices (S30). If the priority receiving section 40 receives priority levels transmitted from other wireless LAN devices (Yes in S40), the wireless LAN device performs steps S20 to S30 again. If the priority receiving section 40 does not receive priority levels transmitted from other wireless LAN devices (No in S40), the relaying section 41 relays to the other wireless LAN device having the highest priority level which the wireless LAN device has stored in its priority storing section a packet directed to the outer network (S50). The above-described processes are performed repeatedly at every predetermined period of time (e.g., every 10 seconds).

Next, operation of a wireless LAN device will be described in detail. To begin with, the priority setting process in the wireless LAN system 20 will be described with reference to FIG. 4 and FIG. 5. The priority setting process is performed in each of the wireless LAN devices WLD1 to WLD3 to set the priority level of each of the wireless LAN devices WLD1 to WLD3. In this example, the priority setting process starts after the wireless LAN devices WLD1 to WLD3 have been connected in wireless communication to one another. Thereafter, the priority setting process is performed repeatedly at predetermined time intervals (e.g., every 10 seconds). In this example, the priority level is represented by two bits, and thus four priority levels from 3 (highest) to 0 (lowest) are employed. However, the number of priority levels may be set appropriately depending on the number of wireless LAN devices included in the wireless LAN system 20. For example, two priority levels or six priority levels may be employed. Further, the priority level of each of the wireless LAN devices WLD1 to WLD3 is set to the lowest level of 0 in default setting.

Figure 4:
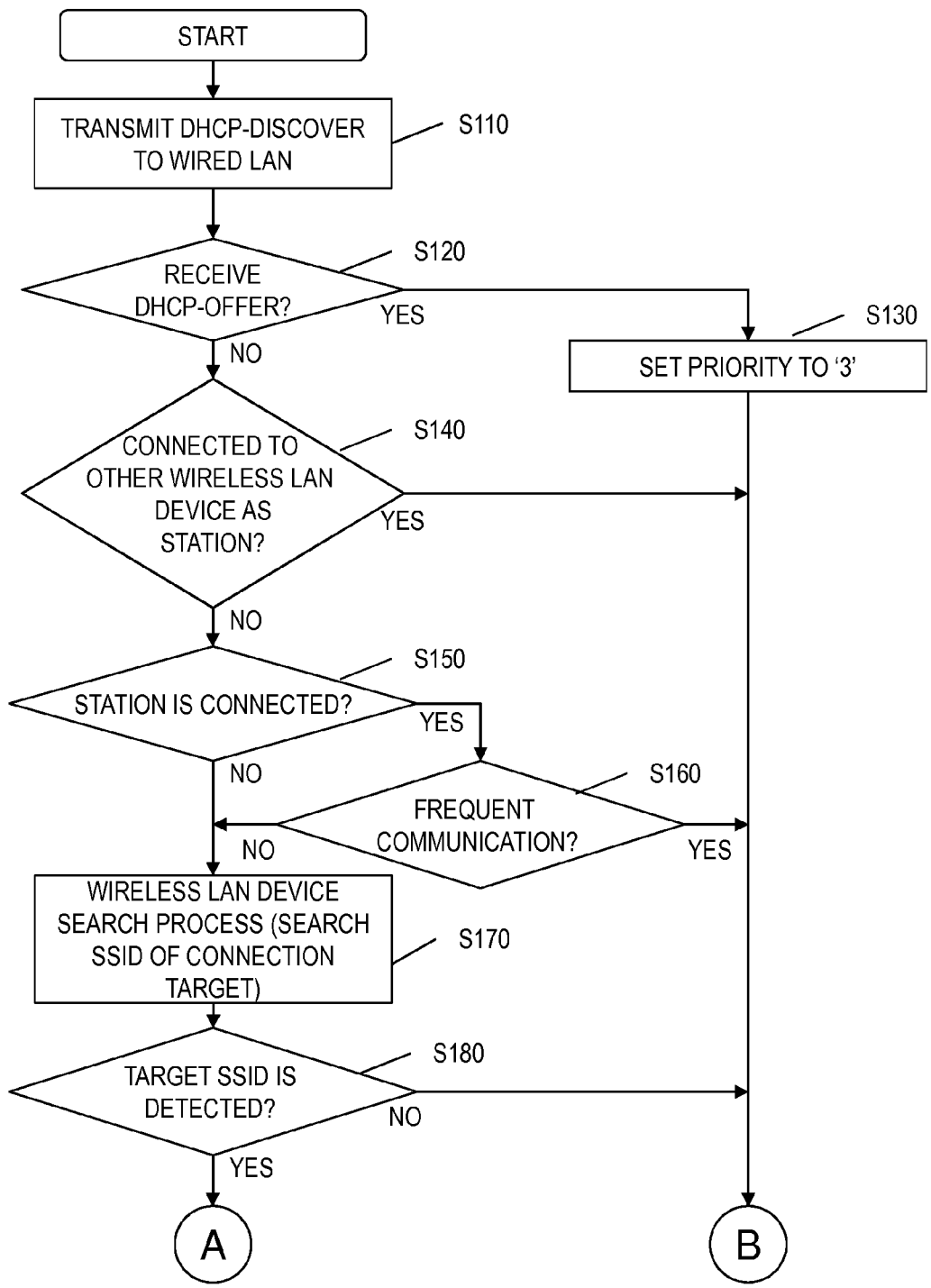
FIG. 4 is a flowchart showing a first half part of a flow of a priority setting process.
Figure 5:
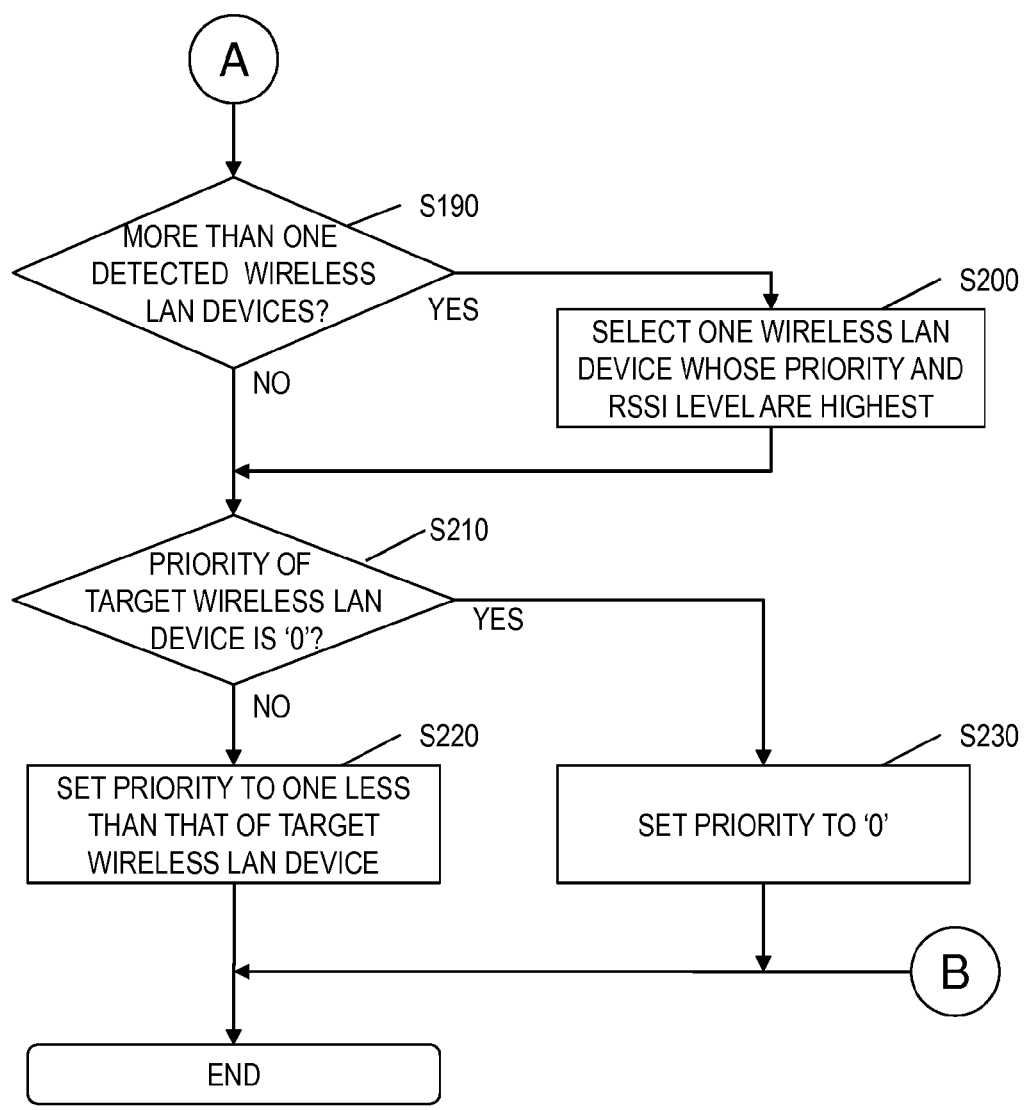
FIG. 5 is a flowchart showing a second half part of the flow of the priority setting process.

Referring to FIG. 4, when the priority setting process starts, the wired communication section 31 of a wireless LAN device (for convenience of description, the wireless LAN device WLD1 will be referred to) transmits a DHCP-Discover message to an outer network, e.g., a wired LAN (step S110). After transmission of the DHCP-Discover message, the determination section 33 determines whether the wired communication section 34 of the wireless LAN device WLD1 has received a DHCP-Offer message, which is a response to the DHCP-Discover message (step S120). The processes in steps S110 and S120 are performed to determine whether the wireless LAN device WLD1 is connected to the outer network, and correspond to step S10 in FIG. 3. In a relatively small-scale usage environment such as in a standard home, the gateway function and the DHCP function are usually incorporated in a router device or a gateway server. The determination section 33 can highly accurately determine whether the wireless LAN device is connected to an outer network, based on whether the wireless LAN device has received a response to the DHCP-Discover message. However, determination of whether the wireless LAN device WLD1 is connected to an outer network may be made using another technique. For example, if the wireless LAN device WLD1 does not use a wired interface except for connection with an outer network, the determination may be made by detecting whether a cable is connected to the wired interface. Alternatively, the determination may be made by a user setting a WEB browser or the like so as to indicate whether the wireless LAN device WLD1 is connected to an outer network, and by the determination section 33 reading the setting information.

If a response has been received (YES in step S120), which indicates that the wired communication section 31 is connected to an outer network, the priority setting section 34 of the wireless LAN device WLD1 sets the priority level of the wireless LAN device WLD1 to the highest level of "3" (step S130), and ends the priority setting process.

On the other hand, if no response has been received (NO in step S120), which indicates that the wired communication section 31 is not connected to an outer network, the priority setting section 34 uses the station interface 52 of the wireless communication section 32 to determine whether the wireless LAN device WLD1 is connected as a station to an access point, i.e., the other wireless LAN device, for example, in the case of the wireless LAN device WLD1, connection to the other wireless LAN device AP2 or AP3 (step S140).

If it is determined that the wireless LAN device WLD1 is connected as a station (YES in step S140), the priority setting section 34 will not set the priority level, and ends the priority setting process. When the wireless LAN device WLD1 has detected an access point while the wireless LAN device WLD1 is connected as a station to another access point, there is a possibility that disconnection and connection will be performed repeatedly. To prevent such a case, a process, which will be described later, is performed. With this process, the priority level will not be changed, or the relay path will not be changed during communication. Therefore, communication currently performed can be completed securely.

If the wireless LAN device WLD1 is not connected as a station (NO in step S140), the priority setting section 34 of the wireless LAN device WLD1 determines whether a station is connected to the access point interface 51 of the wireless LAN device WLD1 (step S150). If a station is connected (YES in step S150), the priority setting section 34 determines whether communication is frequently performed between the wireless LAN device WLD1 and the station (step S160). Whether communication is frequently performed may be determined based on whether communication was last performed within a predetermined period of time. If communication was last performed with in a predetermined period of time, the priority setting section 34 determines that communication is performed frequently. In this embodiment, the predetermined period of time is set as twice as long as the cycle of beacons (here, 100 msec). If communication is performed frequently (YES in step S160), the priority setting section 34 ends the priority setting process without setting priority levels. The process is performed as described above for the same reason as the process performed when the wireless LAN device WLD1 is connected as a station in step S140 (YES in step S140).

If communication is not performed frequently (NO in step S160), or if a station is not connected to the access point interface 51 (NO in step S150), the priority setting section 34 performs a wireless LAN device search process (step S170). This process searches for any of the other wireless LAN devices WLD1, WLD2 and WLD3 as a connection target. Here, active scanning is used as the search method, and the search process is performed by broadcasting a probe request. This process will be described later in detail.

When any of the other wireless LAN devices has been detected as the connection target, the priority receiving section 40 of the wireless LAN device WLD1 receives a probe response transmitted by the detected other wireless LAN devices WLD2 or WLD3. The priority setting section 34 of the wireless LAN device WLD1 then determines whether a probe response including a Service Set Identifier (SSID) is received from the connection target, that is, a probe response including the same SSID as that of the wireless LAN device WLD1 is received (step S180). The frame structure of the probe response is set by IEEE 802.11 standard, and has an optional area. In this embodiment, the priority transmitting section 35 transmits the probe response while including, in the optional area, the priority level set by the priority setting process.

If a probe response from the connection target including the SSID is not detected (NO in step S180), it indicates that none of the other wireless LAN devices WLD2 and WLD3 are to be the connection target. Thus, the priority level is not set, and the priority setting section 34 of the wireless LAN device WLD1 ends the priority setting process. On the other hand, if a probe response from the connection target including the SSID is detected (YES in step S180), the priority setting section 34 determines whether there are a plurality of wireless LAN devices (hereinafter, the wireless LAN devices are referred to as detected wireless LAN devices) having transmitted the detected probe responses (step S190) (see FIG. 5).

If a plurality of detected wireless LAN devices have transmitted probe responses (YES in step S190), the priority setting section 34 of the wireless LAN device WLD1 selects one of the detected wireless LAN devices that has the highest priority level. If a plurality of detected wireless LAN devices have the highest priority level, the priority setting section 34 of the wireless LAN device WLD1 selects one of the wireless LAN devices that has the highest RSSI level, from among the plurality of detected wireless LAN devices (step S200). The priority setting section 34 of the wireless LAN device WLD1 determines the priority level of the detected wireless LAN devices by parsing the optional areas of the received probe responses.

When there is only one wireless LAN device detected (NO in step S190), or when the priority setting section 34 of the wireless LAN device WLD1 has selected one of the wireless LAN devices that has the highest RSSI level from among a plurality of detected wireless LAN devices having the highest priority level (step S200), the priority setting section 34 of the wireless LAN device WLD1 determines whether the priority level of the selected wireless LAN device (in this case, the other wireless LAN devices WLD2 or WLD3 might be the selected wireless LAN devices) (hereinafter referred to as a target wireless LAN device) is the lowest level of "0" (step S210). When the priority level is not "0" (NO in step S210), the priority setting section 34 of the wireless LAN device WLD1 sets the priority level of the wireless LAN device WLD1 to be one level lower than the priority level of the target wireless LAN device WLD2 or WLD3 (step S220). The set priority level is stored in the priority storing section 44 of the wireless LAN device WLD1. For example, when the priority level of the target wireless LAN device is "2", the priority level set to the wireless LAN device WLD1 is "1".

On the other hand, when the priority level of the target wireless LAN device is "0" (YES in step S210), the priority setting section 34 of the wireless LAN device WLD1 sets its priority level to "0" (step S230). The set priority level is stored in the priority storing section 44 of the wireless LAN device WLD1. The priority setting process then ends.

A wireless LAN device having the highest RSSI level is selected in above step S200 because the wireless LAN device that has the highest RSSI level, that is, the wireless LAN device that has the highest radio-wave receiving sensitivity and that is highly likely to establish a stable communication, is regarded as an access point, and the other wireless LAN devices acting as stations attempt to make a connection to the access point, i.e., the wireless LAN device, in the connection process to be described later.

In the above described process, the steps S130 and S170 correspond to step S30 in FIG. 3. Step S180 corresponds to step S40 in FIG. 3. Processes in steps S140 to S160, and steps in S190 and thereafter correspond to step S20 in FIG. 3.

When the priority setting process has been performed in this manner, the priority transmitting section 35 of the wireless LAN device WLD1 transmits to the other wireless LAN devices WLD2 and WLD3 the priority level set to the wireless LAN device WLD1 by using a management frame such as a probe response. By transmitting the priority level by utilizing the management frame, communication specifically designed for priority transmission is not required. Thus, the configuration of the wireless LAN device can be simplified. In addition, this transmission does not increase loads on the network. The priority receiving section of each of the wireless LAN devices WLD1 to WLD3 having received the priority levels of the other wireless LAN devices stores the priority level of its own wireless LAN device and the priority levels of the other wireless LAN devices into the priority storing section.

Figure 6:
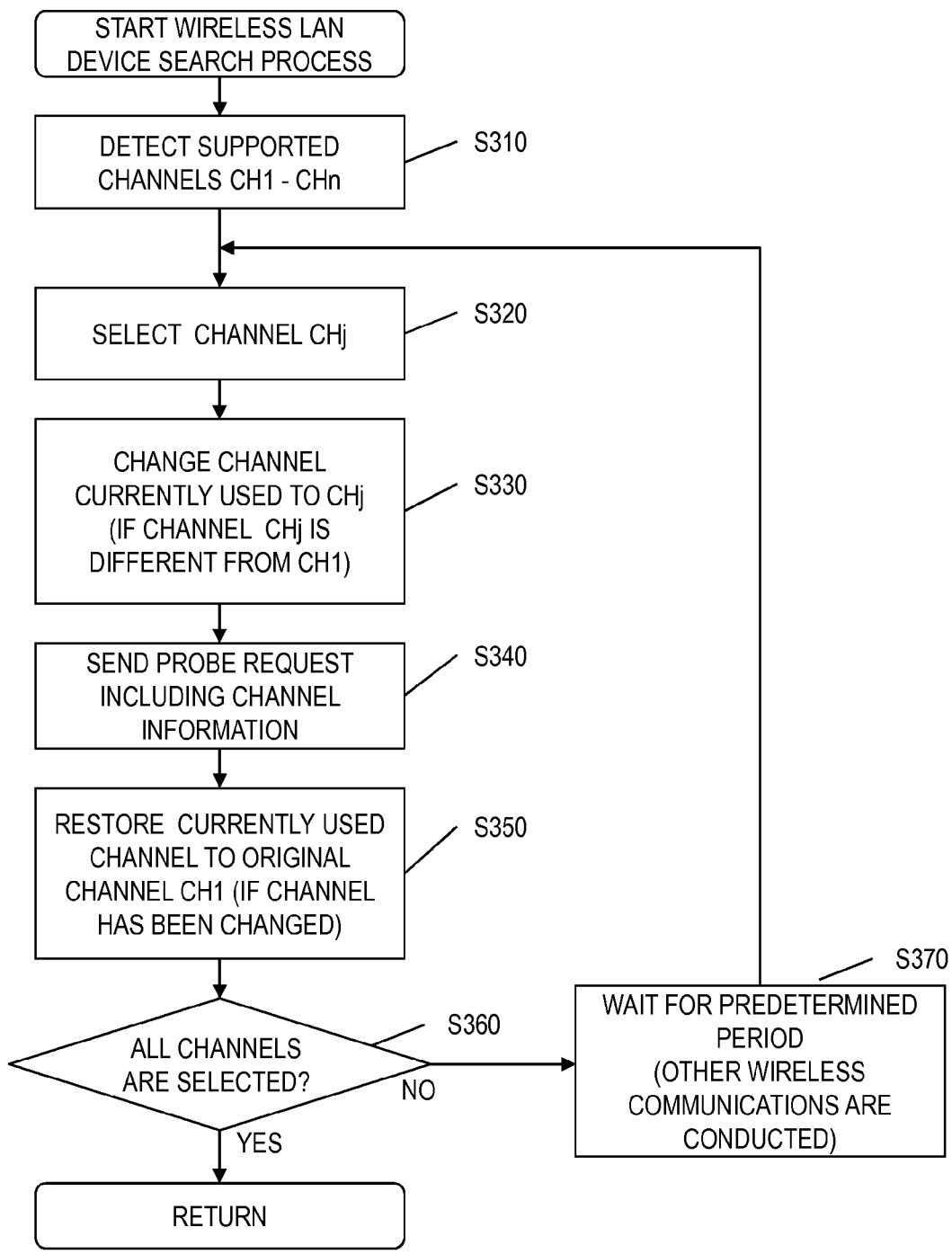
FIG. 6 is a flowchart showing a flow of a wireless LAN device search process.

Next, the above-described wireless LAN device search process (step S170 in FIG. 4) will be described. Hereinafter, description will be given on a case where the wireless LAN device WLD3 transmits a probe request while it is connected to a wireless terminal WT. In this embodiment, it will be assumed that the wireless LAN device WLD3 is performing communication with the wireless terminal WT using a channel CH1. FIG. 6 shows a flow of the wireless LAN device search process. When the wireless LAN device search process starts, as shown in the drawing, the requesting section 36 of the wireless LAN device WLD3 searches for channels CH1 to CHn supported by the wireless LAN device WLD3 (step S310). The numbers 1 to n are assigned to the channels for convenience of distinguishing N channels from one another.

Upon detection of the channels CH1 to CHn, the requesting section 36 of the wireless LAN device WLD3 selects one channel CHj (j is an integer of one or more and N or less) from among such channels that are yet to be used to transmit a probe request (step S320). When the channel CHj has been selected, and if the selected channel CHj is different from the channel CH1 originally used for the communication with the wireless terminal WT, the requesting section 36 changes the channel to be used from the channel CH1 to the channel CHj (step S330). If the channel CHj is the same as the channel CH1, the requesting section 36 does not change the channel.

When the channel has been changed, the requesting section 36 utilizes the channel CHj to broadcast a probe request having assigned thereto channel information (step S340). The channel information indicates the channel CH1 is used for communication with the station. The frame structure of the probe request is set by the IEEE802.11 standard, and frame components making up the probe request frame include an optional area which the vendor can define freely. In this embodiment, the requesting section 36 writes, as an example, the channel information into the optional area thereby to assign the channel information to the probe request. In this embodiment, if the channel is not changed in step S330, the requesting section 36 transmits the probe request without assigning the channel information to the probe request in step S340. However, in an alternative embodiment, the requesting section 36 may transmit the probe request with the channel information assigned to the probe request.

Upon transmission of the probe request by the requesting section 36 of the wireless LAN device WLD3, the post-request restoring section 37 restores the channel to be used to the original state, i.e., the channel CH1, within a predetermined period of time (step S350). In this embodiment, the requesting section 36 transmits the probe request after the change of the channel, and the post-request restoring section 37 restores the channel to be used to the original channel CH1 within a predetermined period of time T1. It is more preferable if the predetermined period of time T1 is shorter. It is also preferable to set the predetermined period of time T1 to be equal to or shorter than a beacon transmission interval T which is a predetermined interval, and upon which a wireless LAN device WLD1 bases transmission of beacons to maintain and manage the network including the wireless terminal WT. Accordingly, the channel can be restored to the original CH1 before a beacon is transmitted, and thus it is possible to prevent omission of beacon transmission using the channel CH1. It is possible to prevent communication with the wireless terminal WT from being disconnected. It is noted that if the channel has not been changed in step S330, the post-request restoring section 37 need not perform any process in step S350.

Next, the requesting section 36 of the wireless LAN device WLD3 determines whether all the channels CH1 to CHn have been selected in step S320 (step S360). If there is any channel yet to be selected (NO in step S360), the requesting section 36 waits for a predetermined period of time T3 (step S370). During the predetermined period of time T3 in step S370, another wireless communication using the original channel, that is, beacon transmission utilizing the channel CH1 or communication with the wireless terminal WT is performed. After waiting for the predetermined period of time T3, the requesting section 36 returns the processing to step S320. Thereafter, the processes in steps S320 to S360 are repeated.

The predetermined period of time T3 in step S370 is preferably set equal to or longer than the beacon transmission interval T of the wireless LAN device WLD1, and more preferably set twice or more in length than the beacon transmission interval T of the wireless LAN device WLD1. If the predetermined period of time T3 is equal to or longer than the beacon transmission interval T, the wireless LAN device WLD3 can transmit a beacon at least once within the predetermined period of time T3 in step S370. Thus, it is possible to prevent communication with the wireless terminal WT from being disconnected. Further, beacons may disappear on the channel due to noises or the like, or will not be received by the wireless terminal WT appropriately. If the predetermined period of time T3 is twice or more of the beacon transmission interval T, e.g., it is twice, three times, or the like, the wireless LAN device WLD3 can transmit beacons twice or more. Thus it becomes less likely to lose all beacons during the predetermined period of time T3, and it is securely prevents communication disconnection.

Figure 8:
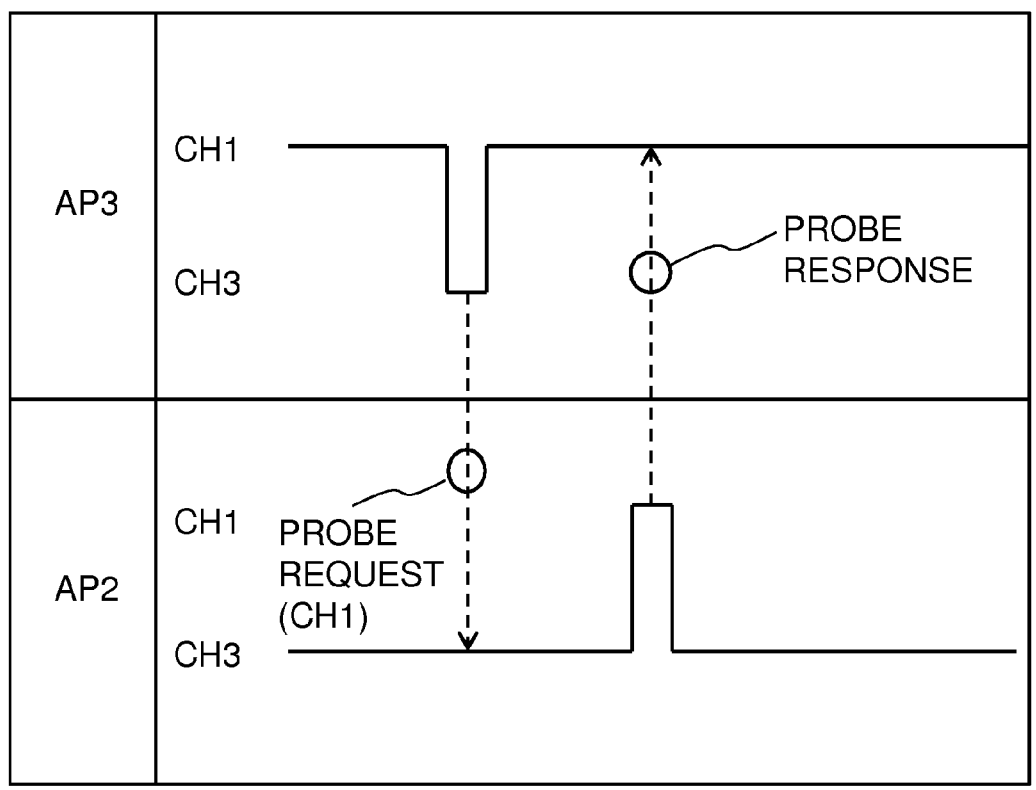
FIG. 8 is a diagram illustrating a manner of channel switching in the wireless LAN device search process and in the receiving process.

If the requesting section 36 has transmitted the probe request using all the channels CH1 to CHn (YES in step S360), the wireless LAN device search process on the transmission side ends. As is clear from the above description, the wireless LAN device WLD3 changes the channel from the channel CH1 being originally used to another channel, e.g., CH3 for a short period of time as shown in FIG. 8, and thereby transmits the probe request having assigned thereto the channel information indicating the channel CH1 originally used. In this manner, the wireless LAN device WLD3 can transmit to the other wireless LAN devices the channel CH1 which the wireless LAN device WLD3 itself is originally using.

Figure 7:
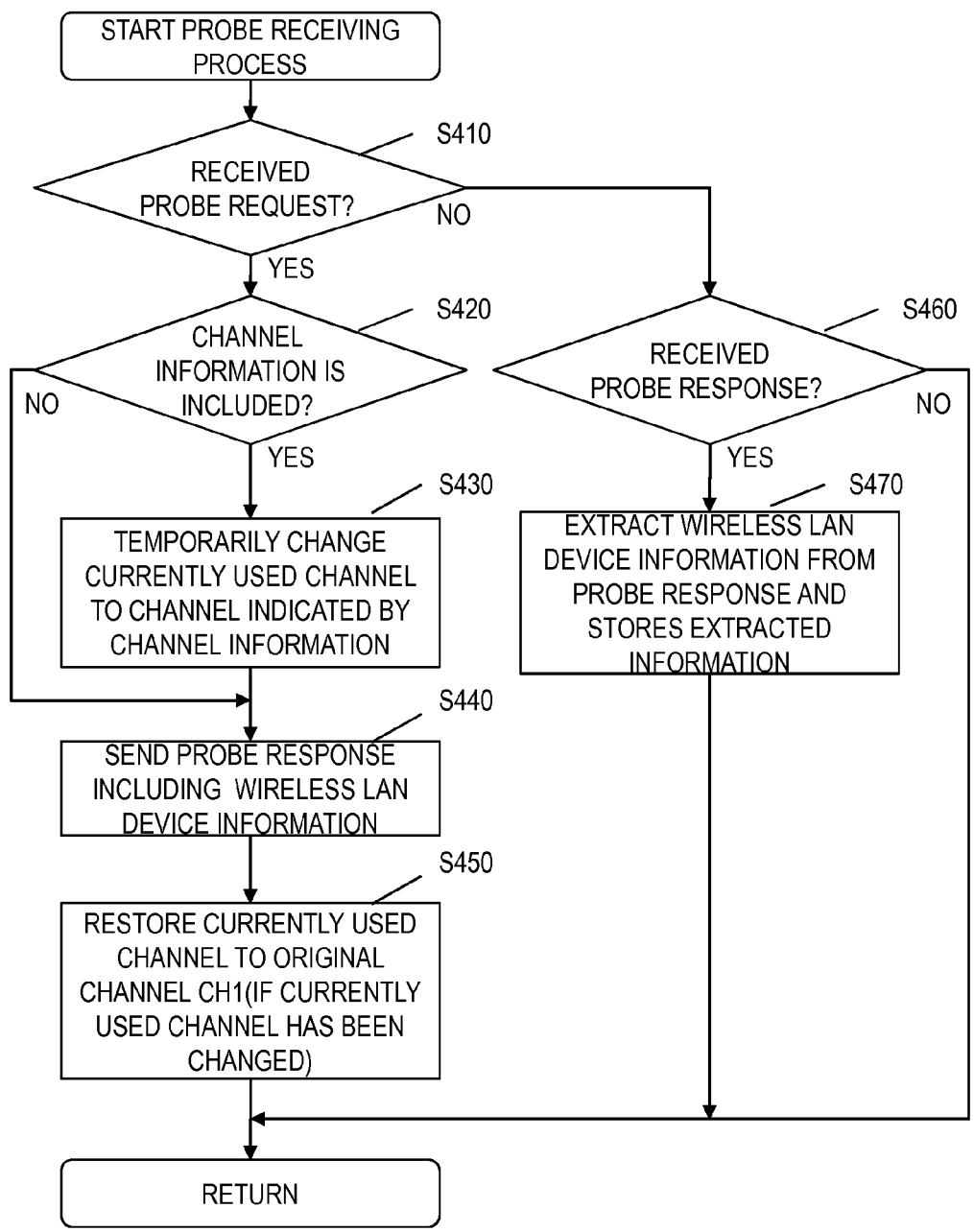
FIG. 7 is a flowchart showing a flow of a receiving process.

Description will now be given of a process (hereinafter also referred to as a receiving process) performed, in accordance with the received frame, by any of the wireless LAN devices WLD1 to WLD3 which has received the probe request transmitted by the wireless LAN device search process, or by any of the wireless LAN devices WLD1 to WLD3 which has received a probe response in response to the probe request. For convenience of description, it will be assumed hereinafter that the wireless LAN device WLD2 receives a probe request or a probe response from the wireless LAN device WLD3. FIG. 7 shows a flow of the receiving process. When the receiving process starts, as shown in the diagram, the responding section 38 of the wireless LAN device WLD2 determines whether the wireless LAN device WLD2 has received a probe request (step S410). During the process, other communication processes such as communication with the wireless terminal WT, continue.

if the probe request has been received (YES in step S410), the responding section 38 of the wireless LAN device WLD2 determines whether the optional area, one of the frame components constituting the probe request, includes the channel information (step S420). If the channel information is included (YES in step S420), it indicates that the wireless LAN device WLD3 which transmitted the probe request is waiting for a probe response using the channel CH1 indicated by the channel information. Thus, the responding section 38 of the wireless LAN device WLD2 temporarily changes the channel from a channel currently used, e.g., the channel CH3, to the channel CH1 indicated by the channel information (step S430).

Upon changing of the channel currently used to the CH1 channel, the responding section 38 of the wireless LAN device WLD2 transmits to the wireless LAN device WLD3 a probe response having included therein information (SSID, channel information, and the like) of the wireless LAN device WLD2 (step S440). In the IEEE802.11 standard, the channel information is set as an information component included in a probe response, and thus the responding section 38 can assign the channel information to a probe response without using an extended area. On the other hand, if the channel information is not included (NO in step S420), the responding section 38 transmits the probe response to the wireless LAN device WLD3 (step S440) using the channel CH1 as it is without changing the channel (i.e., without step S430).

The responding section 38 of the wireless LAN device WLD2 then ends transmission of the probe response. Thereafter, the post-response restoring section 39 of the wireless LAN device WLD2 restores the channel currently used to the original channel before change, i.e., CH3 if the channel has been changed in step S430 (step S450), and then the receiving process ends. Here, the following processes are performed within a predetermined period of time T2: changing of the channel; transmission of the probe response; and restoration of the channel to the original channel. It is preferable that the predetermined period of time T2 is set as short as possible in the same manner as in step S350. Accordingly, the wireless LAN device WLD3 can continue communication with the wireless terminal WT using the channel prior to the change. As is clear from the above description, the wireless LAN device WLD2 changes, for a short period of time, the channel to be used from, e.g., channel CH3 to CH1 which the wireless LAN device WLD3 is originally using, as shown in FIG. 8, thereby to transmit the probe response. In this manner, the wireless LAN device WLD3 can receive the probe response by using the channel CH1 which is originally used.

Referring again to step S410, if the probe request has not been received (NO in step S410), the priority receiving section 40 of the wireless LAN device WLD2 determines whether the wireless LAN device WLD2 has received the probe response (step S460). If the wireless LAN device has not received the probe response (NO in step S460), the priority receiving section 40 ends the receiving process. If the wireless LAN device has received the probe response (YES in step S460), the priority receiving section 40 extracts information about the wireless LAN device WLD2 (priority level, SSID, channel information, and the like) from the probe response, and stores the extracted information such as the priority levels into the priority storing section 44 (step S470). Thereafter, the receiving process ends. If the channel information is stored in this manner, each wireless LAN device can specify the channel used for communication with the other wireless LAN devices even if the channels of the wireless LAN devices included in the wireless LAN system 20 are not set in advance. In addition, if each wireless LAN device detects only those other wireless LAN devices whose channels have been stored, the number of channels to be selected in step S320 can be reduced, and thus the wireless LAN device search process can be performed more efficiently.

In the above processes, steps S460 and S470 correspond to step S40 in FIG. 3. The processes in steps S310 to S370, and S410 to S450 correspond to step S30 in FIG. 3.

Figure 9:
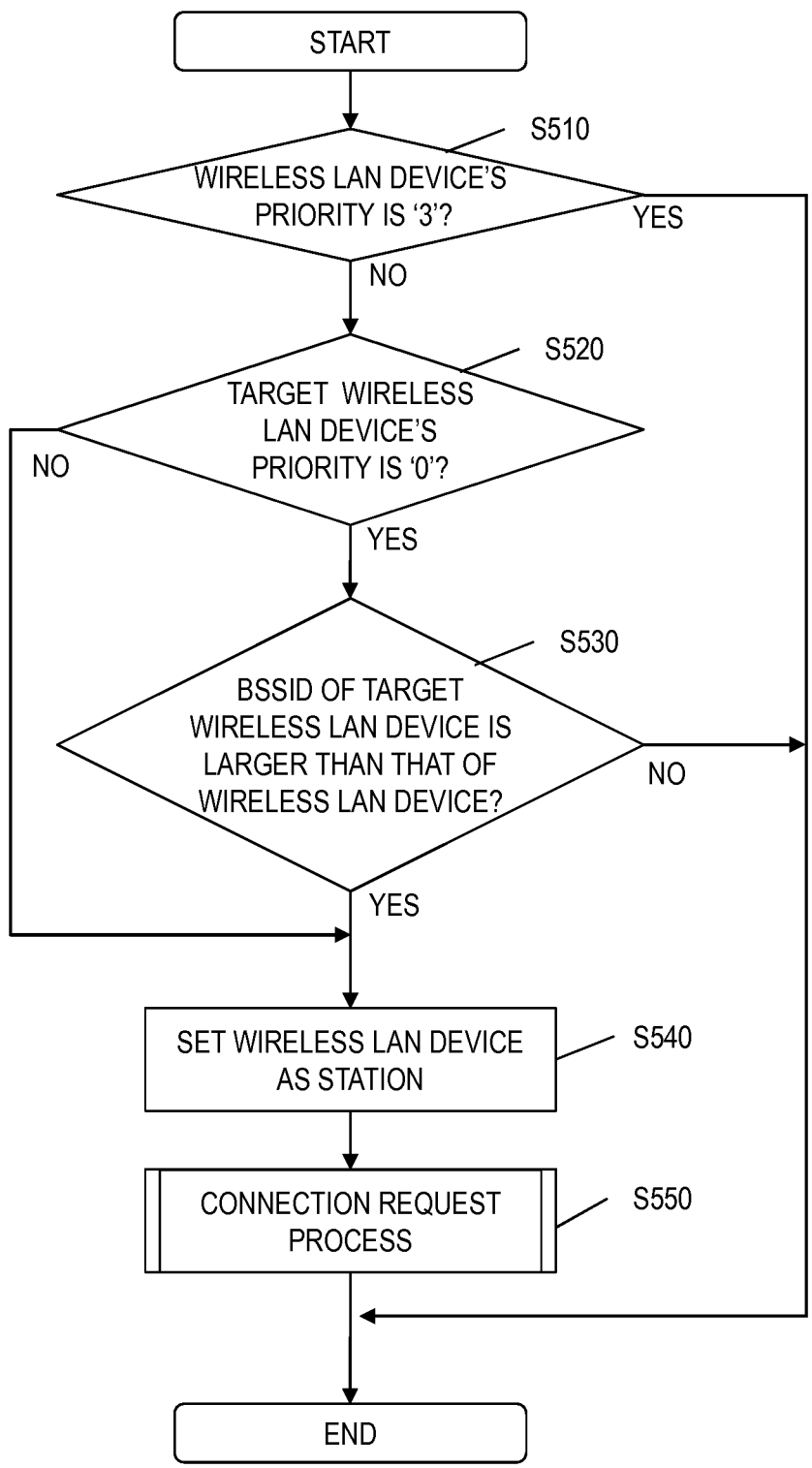
FIG. 9 is a flowchart showing a flow of a connection process.

Next, the connection process in the wireless LAN system 20 will be described. The connection process is a process of the wireless LAN devices WLD1 to WLD3 automatically structuring a network connection mode compliant with the WDS in accordance with the priority level set by the priority setting process. The connection process corresponds to step S50 in FIG. 3. FIG. 9 shows a flow of the connection process. For convenience of explanation, it will be assumed that the priority levels of the wireless LAN devices WLD1 to WLD3, among which the connection process is to be performed, are each set to either "0" or "3". In this embodiment, the connection process starts upon completion of the priority setting process. When the connection process starts, the relaying section 41 of each of the wireless LAN devices WLD1 to WLD3 refers to its corresponding priority storing section 44 to determine whether the priority level set to its wireless LAN device WLD1 to WLD3 is the highest level of "3" (step S510). If its priority level is "3" (YES in step S510), its relaying section 41 ends the connection process. On the other hand, if its priority level is not "3" (NO in step S510), its relaying section 41 next determines whether the priority level of a target wireless LAN device is "0" (step S520).

If the priority level of the target wireless LAN device is not "0" (NO in step S520), the relaying section 41 advances the processing to step S540 described later.

On the other hand, if the priority level of the target wireless LAN device is "0" (YES in step S520), the relaying section 41 of the wireless LAN device WLD1 to WLD3 determines whether the value of the BSSID of the target wireless LAN device is greater than the value of its corresponding BSSID (step S530). The BSSID of the target wireless LAN device can be obtained from the MAC header of a probe response. In this embodiment, BSSIDs are converted into binary values and compared to each another, whereby the relaying section 41 determines the value of the BSSID of the target wireless LAN device. The determination in step S530 is performed to set a virtual access point/station relationship between wireless LAN devices having the WDS function. The setting of the virtual access point/station relationship is performed for the following reason. That is, the connection request process and the connection setting process to be described later employ an asymmetric protocol, in which details of the processes performed by wireless LAN devices are different depending on whether the wireless LAN devices function as an access point or a station. Setting the access point/station relationship is a convenient way to execute the protocol. The access point/station relationship can be considered as a rank relationship for executing the asymmetric protocol.

If the relaying section 41 of the wireless LAN device WLD1 to WLD3 determines that the value of the BSSID of the target wireless LAN device is greater than the value of the corresponding BSSID (YES in step S530), or if the priority level of the target wireless LAN device is not "0" (NO in step S520), the rank setting section 43 of the wireless LAN device WLD1 to WLD3 virtually sets the corresponding wireless LAN device WLD1 to WLD3 as a station (step S540). On the other hand, if the relaying section 41 of the wireless LAN device AP 1 to WLD3 determines that the value of the BSSID of the target wireless LAN device is less than or equal to the value of the corresponding BSSID of the wireless LAN device WLD1 to WLD3 (NO in step S530), the relaying section 41 ends the connection process. In steps S530 and S540, the rank setting section 43 may use the magnitude of the values of BSSIDs to set the virtual access point/station relationship. Thus, the rank setting section 43 may use the magnitude of the values of the BSSIDs in an opposite way to the above example to set the access point/station relationship. Further, the rank setting section 43 may compare the values of the BSSIDs in order of numeral and alphabet characters constituting the respective BSSIDs. In addition, the rank setting section 43 may compare the values of the BSSIDs obtained by converting the BSSIDs into binary values and performing a predetermined operation on the converted values.

When the rank setting section 43 of each of the wireless LAN device WLD 1 to WLD3 has set the wireless LAN device as a station (step S540), the authenticated connection section 42 performs the connection request process (step S550). The wireless LAN device WLD1 to WLD3 that is not set as a station in step S540 performs the connection setting process as an access point in accordance with the connection request process set by another one of the wireless LAN devices functioning as a station. The connection request process and the connection setting process establish a connection between the access point and the station through authentication that is compliant with the infrastructure mode, and in addition enables exchange of encryption keys used for encrypted communication in a WDS function process mode. Hereinafter, a case will be described by assuming that the wireless LAN device WLD2 is set as the station, and the wireless LAN device WLD1 performs a process as the access point. That is, the wireless LAN device WLD2 performs the connection request process, and the wireless LAN device WLD1 performs the connection setting process.

Figure 10:
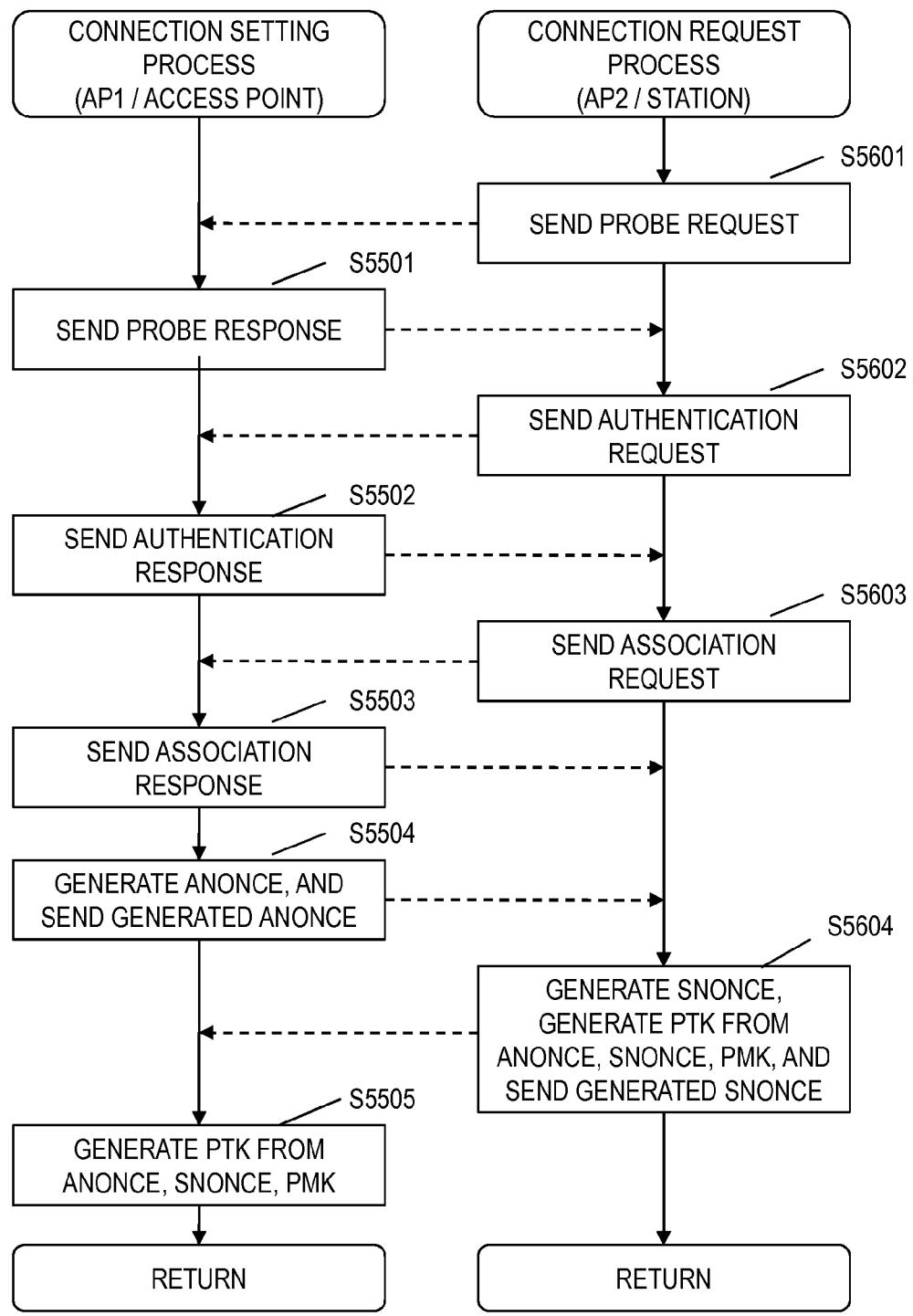
FIG. 10 is a sequence chart showing a connection setting process and a connection request process.

FIG. 10 is a flowchart showing the connection request process and the connection setting process. When the wireless LAN device WLD2 starts the connection request process and the wireless LAN device WLD1 starts the connection setting process, the authenticated connection section 42 of the wireless LAN device WLD2, which has the rank of a station, transmits a probe request to the wireless LAN device WLD1 (step S5601). Meanwhile, the authenticated connection section 42 of the wireless LAN device WLD1, which has the rank of an access point, receives the probe request, and transmits a probe response to the wireless LAN device WLD2 (step S5501).

Upon reception of the probe response transmitted by the wireless LAN device WLD1, the authenticated connection section 42 of the wireless LAN device WLD2 transmits an authentication request to the wireless LAN device WLD1 (step S5602). Upon reception of the authentication request, the authenticated connection section 42 of the wireless LAN device WLD1 transmits an authentication response to the wireless LAN device WLD2 (step S5502). In this embodiment, authentication is performed by means of an open system authentication.

Upon reception of the authentication response, the authenticated connection section 42 of the wireless LAN device WLD2 transmits an association request to the wireless LAN device WLD1 (step S5603). Upon reception of the association request, the authenticated connection section 42 of the wireless LAN device WLD1 transmits an association response to the wireless LAN device WLD2 (step S5503). Upon reception of the association response by the wireless LAN device WLD2, connection between the wireless LAN devices WLD1 and WLD2 is established. The frame structure of the association request is set by the IEEE802.11 standard, and frame components making up the association request include the above-described optional area. In this embodiment, the authenticated connection section 42 of the wireless LAN device WLD2 transmits in step S5603 the association request while including, in the optional area, information on whether a WDS operation is to be performed. The authenticated connection section 42 of the wireless LAN device WLD1 parses the information included in the received association request to determine whether a WDS operation is to be performed. If the information indicates that a WDS operation is to be performed, the authenticated connection section 42 of the wireless LAN device WLD1 stores a MAC address which is information for identification of the wireless LAN device WLD2, and information indicating that the WDS operation is to be performed, while associating these pieces of information with each other. With these functions of the authenticated connection section 42 of the wireless LAN device WLD1 and the authenticated connection section 42 of the wireless LAN device WLD2, it is possible to automatically render the communication between the wireless LAN devices WLD1 and WLD2 compliant with the WDS mode.

Upon reception of the association request, the authenticated connection section 42 of the wireless LAN device WLD1, which has the rank of an access point, generates random numbers (ANonce), and transmits the ANonce to the wireless LAN device WLD2, which has the rank of a station (step S5504). Upon reception of the ANonce, the authenticated connection section 42 of the wireless LAN device WLD2 generates random numbers (SNonce), generates a transient key of Pairwise Transient Key (PTK) based on a master key of Pairwise Master Key (PMK), the ANonce, and the SNonce, and transmits the SNonce to the wireless LAN device WLD1 (step S5604). Upon reception of the SNonce, the authenticated connection section 42 of the wireless LAN device WLD1 generates, in the same manner as the wireless LAN device WLD2, the transient key PTK based on the master key PMK, ANonce, and SNonce. When the transient keys PTK are exchanged (shared) between the wireless LAN devices WLD1 and WLD2 in this manner, the connection setting process and the connection request process end. The transient keys PTK are to be used for encryption of a packet in a relay process, which is the WDS operation to be described later in detail.

In this embodiment, the communication for sharing the transient keys PTK is encrypted based on a predetermined encryption method using preshaped keys PSK. In this embodiment, the encryption is performed based on an Advanced Encryption Standard (AES). Alternatively, another technique such as a Wired Equivalent Privacy (WEP), and a Temporal Key Integrity Protocol (TKIP) may be used. This encrypted communication can further enhance security. In this embodiment, preshared keys PSK that are set to the wireless LAN devices WLD1 to WLD3 in default setting during the manufacturing process are shared as the master keys PMK.

Next, with reference to FIG. 11, the relay process in the wireless LAN system 20 will be described. The relay process transfers a packet, which has been transmitted by a wireless terminal (wireless terminal WT in this example) in the wireless LAN system 20 directed to the outer network (e.g., internet INT), to a router RT by means of inter-wireless LAN device communication compliant with the WDS. The relay process corresponds to step S50 in FIG. 3. In the relay process, based on the priority levels of the wireless LAN devices WLD1 to WLD3 set in the above-described priority setting process, a relay path for the packet is determined.

Figure 11:
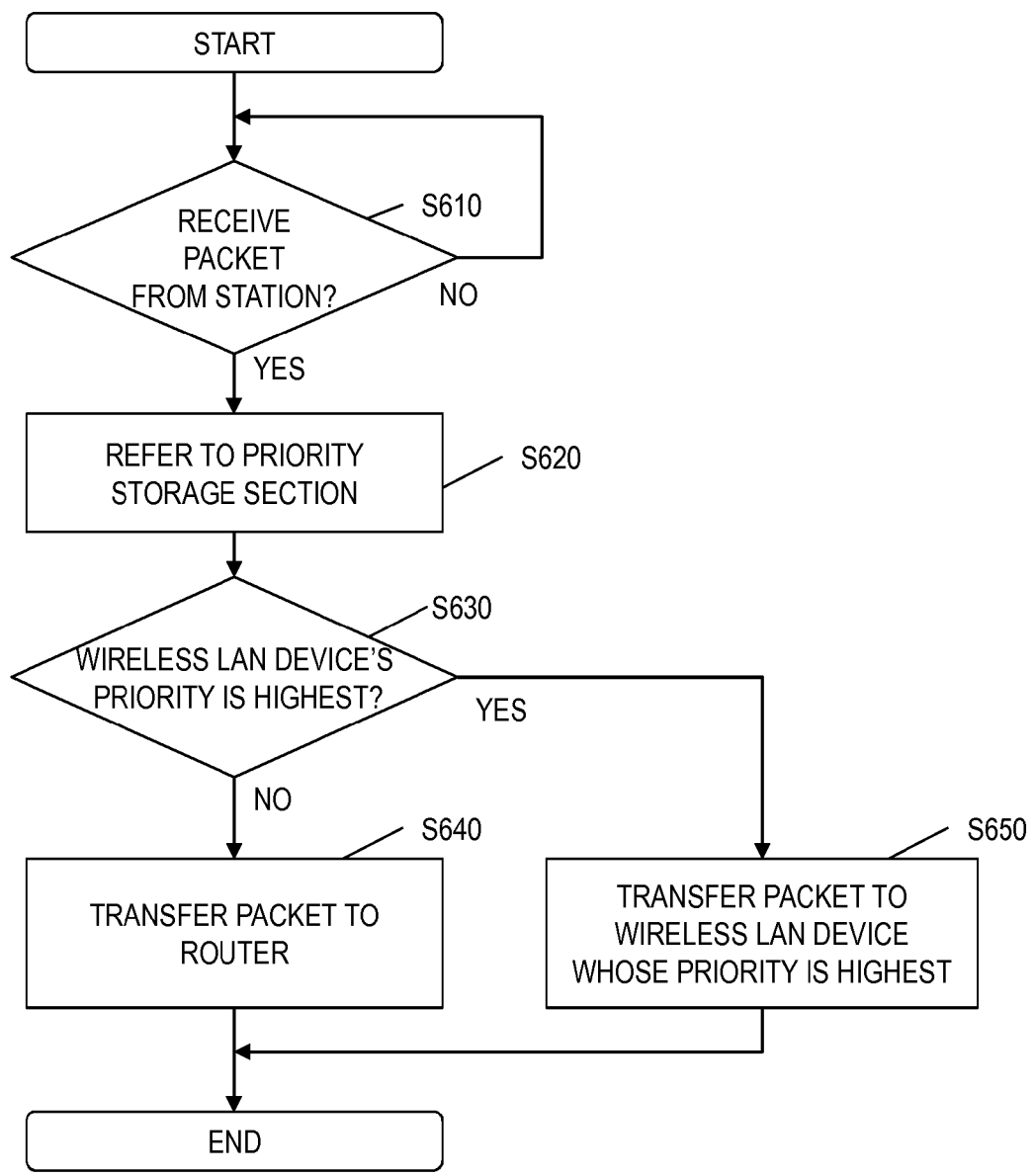
FIG. 11 is a flowchart showing a flow of a relay process.

When the relay process starts, the relaying section 41 of each of the wireless LAN devices WLD1 to WLD3 waits for reception of a packet directed to the outer network (e.g. internet INT) transmitted by the wireless terminal WT, or by any of the other wireless LAN devices WLD1 to WLD3 acting as a station (step S610), as shown in FIG. 11. In this embodiment, if destination information included in the packet is unknown (not registered), the relaying section 41 determines that the packet is directed to outer network (e.g. the internet INT). Upon reception of the packet directed to the outer network (e.g. internet INT) (YES in step S610), the relaying section 41 refers to the priority storing section 44 (step S620), to determine whether the corresponding wireless LAN device WLD1 to WLD3 has the highest priority level of "3" (step S630).

if the wireless LAN device has the highest priority level (YES in step S630), it indicates that the wireless LAN device is connected to the router RT via a wired interface. Therefore, the relaying section 41 transfers to the router RT the received packet (step S640). On the other hand, if the wireless LAN device does not have the highest priority level (NO in step S630), the relaying section 41 transfers, in a manner compliant with the WDS, the received packet to another wireless LAN devices WLD1 to WLD3 that has the highest priority level (step S650), by selecting the wireless LAN device based on the information stored in the priority storing section 44. Communication in step S650 is encrypted by using the encryption keys that were exchanged between the wireless LAN devices in the connection process. If a plurality of wireless LAN devices among the wireless LAN devices WLD1 to WLD3 have the highest priority level within a range where radio waves are reachable to one another, the priority setting section 34 selects, in the priority setting process, a wireless LAN devices WLD1 to WLD3 that has the highest RSSI level (step S200 in FIG. 5), and the authenticated connection section 42 attempts connection to the selected wireless LAN device (step S550 in FIG. 9). Thus, the packet is relayed to the wireless LAN device having the highest RSSI level. When the packet has been transferred in this manner, the relay process ends.

After the relay process, the authenticated connection section 42 can change, at a predetermined timing, the transient keys PTK which are shared among the wireless LAN devices WLD1 to WLD3 which perform the WDS operation. The changed transient keys PTK can be shared by the wireless LAN devices by using the same method as in steps S550 and S560. The timing of changing the transient keys PTK may be set as appropriate, and thus the transient keys PTK may be changed at predetermined time intervals such as at predetermined communication time intervals and at session intervals, or may be changed each time a predetermined amount of communication has been made. In addition the period of time may be changed at random. In this manner, with such dynamic transient keys PTK shared by the authenticated connection sections 42 of the respective wireless LAN devices, the security level in the relay process is significantly increased.

The wired communication section 31, the wireless communication section 32 (as well as the components included therein), the determination section 33, and the priority setting section 34 are realized by the CPU's loading, into a RAM, a program such as firmware, stored in a flash ROM or a ROM, and executing the program. Further, the priority storing section 44 is realized by a storage device such as a ROM. It should be noted that programs of the wired communication section 31 and the wireless communication section 32 (as well as the components included therein) utilize the wired interface and wireless interface of each wireless LAN device, respectively.

Next, effects of this embodiment will be described. In the wireless LAN system 20 having a configuration illustrated in this embodiment, each of the wireless LAN devices WLD1 to WLD3 included in the wireless LAN system 20 determines whether it is connected to the internet INT, and transmits its own priority level set at least based on the determination result to the other wireless LAN devices WLD1 to WLD3 which are present in a range where radio waves are reachable to one another. The priority level of the wireless LAN device that is determined to be connected to an outer network is set relatively higher. The wireless LAN devices WLD1 to WLD3 having received the priority levels of the other wireless LAN devices WLD1 to WLD3 relay a packet, which is directed to the outer network, to one of the other wireless LAN devices that has the highest priority level. Therefore, if the wireless LAN device WLD1 which is connected to an outer network is present in a radio-wave reachable range, the wireless LAN devices WLD2 and WLD3 relay the packet to the wireless LAN device WLD1. The relay path composed of the wireless LAN devices WLD1 to WLD3 to access an outer network via the wireless LAN WLD2 if necessary can be automatically established in an efficient manner.

Further, in the wireless LAN system, if it is determined that the wireless LAN devices WLD1 to WLD3 are not connected to an outer network, the priority level of each of the wireless LAN devices WLD1 to WLD3 is set depending on the priority levels of the other wireless LAN devices. Therefore, even if the wireless LAN devices WLD2 and WLD3 are not connected to an outer network, their priority levels can be set as appropriate.

Further, in the wireless LAN system 20, if a wireless LAN device WLD1 to WLD3 has determined that none of the detected other wireless LAN devices WLD1 to WLD3 have the lowest priority level of "0", the wireless LAN device sets its priority level to be one level lower than the priority level of the other of the wireless LAN device WLD1 to WLD3 that has the highest priority level (the detected one of the other wireless LAN devices WLD1 to WLD3 if the one wireless LAN device has detected only one of the other wireless LAN devices WLD1 to WLD3). Therefore, the priority levels of the wireless LAN devices WLD1 to WLD3 can be set hierarchically, such that the priority level of the wireless LAN device WLD1 connected to the outer network is set to be highest, and the priority levels of the wireless LAN devices WLD2 and WLD3 are set depending on the number of relay points to the wireless LAN device WLD1. The relay path composed of the wireless LAN devices WLD1 to WLD3 can be established efficiently.

Further, in the wireless LAN system 20, if a wireless LAN device WLD1 to WLD3 has determined that all of the other wireless LAN devices WLD1 to WLD3 have the lowest priority level of "0", the wireless LAN device sets its priority levels to "0". Accordingly, it is possible to prevent a wireless LAN device WLD 1 to WLD3 from relaying to other wireless LAN devices WLD1 to WLD3 a packet directed to the outer network. The relay path can be established efficiently.

The above-described effects will be specifically described by using the environment where the wireless LAN devices WLD1 to WLD3 are used as illustrated in FIG. 1. In the priority setting process, since the wireless LAN device WLD1 is connected to the router RT, the wireless LAN device WLD1 sets its priority level to "3". Further, since both the wireless LAN devices WLD2 and WLD3 can detect the wireless LAN device WLD1, the priority levels of the wireless LAN devices are set to "2", one level lower than the priority level "3" of the wireless LAN device WLD1. In the relay process, when the wireless terminal WT transmits a packet directed to the internet INT, the wireless LAN device WLD3 relays the received packet to the wireless LAN device WLD 1, which has the highest priority level. Thus, the packet will not be relayed from the wireless LAN device WLD3 to the wireless LAN device WLD1 via the wireless LAN device WLD2. That is, the relay path can be established efficiently. Meanwhile, if the relay destination is determined based on the RSSI level, since the distance between the wireless LAN devices WLD3 and WLD2 is shorter than the distance between the wireless LAN devices WLD3 and WLD1, the wireless LAN device WLD3 relays the packet to the wireless LAN device WLD2, which has a relatively higher RSSI level than that of the wireless LAN device WLD1. In such case, the relay path is increased.

Further, in the wireless LAN system 20, the wireless LAN devices WLD1 to WLD3 each access, as stations, the other of the wireless LAN device WLD1 to WLD3 that has a relatively higher priority level set in the priority setting process, and establish a connection in the infrastructure mode, thereby performing communication that is compliant with the WDS. Therefore, the wireless LAN devices WLD1 to WLD3 can automatically establish network connection that is compliant with the WDS, in accordance with the priority levels having been set thereto. Moreover, if two of the wireless LAN devices WLD1 to WLD3 have relatively higher priority levels, the remaining one of the wireless LAN devices WLD1 to WLD3 establishes a connection with one of the plurality of wireless LAN devices that has the highest priority level, and that has the strongest received-signal strength indicator. Therefore, the wireless LAN devices WLD1 to WLD3 can establish a connection that enables efficient and stable communication.

Further, in the wireless LAN system 20, if the wireless LAN devices WLD1 to WLD3 have the same priority level, each of the wireless LAN devices WLD1 to WLD3 sets a rank based on the mutual BSSIDs thereby to establish a connection in the infrastructure mode. Therefore, the wireless LAN devices WLD1 to WLD3 can establish a connection based on the rank.

Further, in the wireless LAN system 20, the wireless LAN devices WLD1 to WLD3 encrypt packets using shared encryption keys, and relay the packets. Thus, security can be ensured. Moreover, the wireless LAN devices WLD1 to WLD3 exchange encryption keys based on the process for establishing connection in the infrastructure mode, by utilizing an access point/station relationship set in the process. Further, the wireless LAN devices WLD1 to WLD3 can exchange encryption keys by using an asymmetric protocol, in which details of the processes differ depending on whether they are performed by the access point or by the station. In addition, the wireless LAN devices WLD1 to WLD3 can perform encrypted communication using a sophisticated encryption method such as a WPA (Wi-Fi Protected Access) and WPA2, which are of high security. Accordingly, the security level can be improved significantly. It should be noted that if a virtual access point/station relationship cannot be set, the wireless LAN devices WLD1 to WLD3 cannot share such dynamic transient keys PTK. In that case, the wireless LAN devices WLD1 to WLD3 can merely perform encrypted communication of relatively low security using a WEP with static encryption keys.

Further, in the wireless LAN system 20, the wireless LAN devices WLD1 to WLD3 transmit a probe request having assigned thereto the channel information indicating the channel CH1 originally used for communication with a wireless terminal, by using a channel that is different from the originally used channel CH1, and restore the channel to be used from the different channel to the originally used channel within a predetermined period of time after transmission of the probe request. Therefore, the wireless LAN devices WLD1 to WLD3 can keep connection with the wireless terminal using the originally used channel CH1, and transmit a probe request using a different channel. Further, any of the wireless LAN devices WLD1 to WLD3 that has received the probe request transmits a probe response using the channel CH1 indicated by the channel information assigned to the received probe request. Therefore, the wireless LAN devices WLD1 to WLD3 having transmitted the probe request can receive a probe response using the originally used channel CH1. Therefore, each of the wireless LAN devices WLD1 to WLD3 can appropriately detect the other wireless LAN devices WLD1 to WLD3 while keeping connection with a station. In this case, the other wireless LAN devices WLD1 to WLD3 perform the detection using a channel different from that which the wireless LAN device is using for connecting a station. Accordingly, the relay path in the wireless LAN system 20 can be established automatically and efficiently.

Further, in the wireless LAN system 20, when any of the wireless LAN devices WLD1 to WLD3 changes the channel of the output band to transmit a probe request, it restores, after transmission of the probe request, the channel to be used to the channel prior to the change. Therefore, it is possible to prevent connection with a wireless terminal using the channel prior to the change from being discontinued.

Next, a modification of the above embodiment will be described. In the above-described embodiment, the wireless LAN system 20 includes the wireless LAN devices WLD1 to WLD3 having the same configuration. However, the wireless LAN system 20 may include a wireless relay device that does not include the wired interface. In the case of the wireless relay device like this, above steps S110 to S130 can be omitted.

In the above-described embodiment, each of the wireless LAN devices WLD1 to WLD3 includes, into the management frame, its priority level set in the priority setting process, thereby to transmit the priority level to the other wireless LAN devices WLD1 to WLD3. However, each of the wireless LAN devices WLD1 to WLD3 may transmit the priority level using communication dedicated to the priority transmission.

In the above-described embodiment, a single wireless LAN device is connected to an outer network in the wireless LAN system 20. However, a plurality of wireless LAN devices may be connected to an outer network. In that case, the highest priority level ("3" in the embodiment) may be set to all of the wireless LAN devices that are connected to the outer network. Alternatively, a plurality of relatively higher priority levels (e.g., "4" and "3") that can be assigned to the wireless LAN devices connected to the outer network, and a plurality of priority levels (e.g., "2" to "0") that can be assigned to the other wireless LAN device that are not connected to the outer network may be set in advance. In that case, each of the wireless LAN devices WLD1 to WLD3 may be assigned any of the set priority levels depending on the determination result in step S120. And the wireless LAN devices that are connected to the outer network broadcast packets indicating that they are connected to the outer network, and the remaining wireless LAN device transfers the packets for a predetermined number of times. The wireless LAN devices connected to the outer network mutually exchange their MAC addresses in this manner, and thereby their priority levels may be set to exhibit relative difference based on the magnitude of the values of the MAC addresses, in the same manner as in step S520.

In the above-described embodiment, the rank (as an access point and a station indicating, for convenience, an access point/station relationship) for executing the asymmetric protocol is set based on the BSSID in step S520. However, the information for setting the rank may be any information as long as the information can be used for identification of the wireless LAN devices WLD1 to WLD3. For example, the information may be a MAC address.

The embodiment of the present invention has been described as above. Of the components according to the above-described embodiment of the present invention, the requesting section 36, the post-request restoring section 37, the responding section 38, the post-response restoring section 39, the authenticated connection section 42, and the rank setting section 43 are supplementary components, and thus some of these may be eliminated or integrated as appropriate. Further, the present invention is not limited to the embodiment. It is understood that the present invention should be embodied in various way without departing from the principal of the invention. For example, the present invention can be realized not only as a wireless LAN system, but also as wireless LAN devices, a program for the wireless LAN devices, a storage medium having stored therein the program, and a method for determining a relay path for a packet. The storage medium may be non-transitory, such as any computer-readable storage medium, or transitory, such as a propagation signal.

What is claimed is:

1. A wireless LAN system comprising:
three or more wireless LAN relay devices for performing wireless communication in a wireless network,
the wireless LAN relay devices each comprising:
  a wired communication section, for performing wired communication with an outer network;
  a wired connection determination section, for determining whether the wireless LAN relay device is wiredly connected to the outer network;
  a wireless communication section, which includes both an access point interface functioning as an access point and a station interface functioning as a station, for performing wireless communication including relaying a packet in the wireless network;
  a priority setting section for setting a priority level of the wireless LAN relay device as a relay destination in a relay path along which the packet travels during transmission through the wireless network to the outer network; and
  a priority storing section for storing a priority level of one or more of the other wireless LAN relay devices, wherein
the wireless communication section comprises:
  a priority transmitting section for transmitting the priority level of the wireless LAN relay device set by the priority setting section to the one or more other wireless LAN relay devices;
  a priority receiving section for receiving the priority levels of the one or more other wireless LAN relay devices from the one or more other wireless LAN relay devices, and storing the received priority level in the priority storing section; and
  a relaying section for relaying the packet to one of the one or more other wireless LAN relay devices that has the highest priority level among the priority levels stored in the priority storing section, wherein
when the wired connection determination section determines that the wireless LAN relay device is wiredly connected to the outer network, the priority setting section sets the priority level of the wireless LAN relay device the highest, and
when the wired connection determination section determines that the wireless LAN relay device is not wiredly connected to the outer network, the priority setting section sets the priority level of the wireless LAN relay device hierarchically depending on the number of relay points to another wireless LAN relay device connected to the outer network, wherein
the priority setting section comprises:
  an access point connection determination section for determining whether a station is connected to the access point interface; and
  a communication frequency determination section for determining whether communication frequency between the wireless LAN relay device and the station is more than or equal a predetermined level, when the access point connection determination section determines that the station is connected to the access point interface, wherein
when the communication frequency determination section determines the communication frequency is more than or equal the predetermined level, the priority setting section ends the priority setting process without setting priority level of the wireless LAN relay device.

2. The wireless LAN system according to claim 1, wherein when the wired connection determination section determines that the wireless LAN relay device is not connected to the outer network, the priority setting section sets the priority level of the wireless LAN relay device based on the priority level of the one or more other wireless LAN relay devices.

3. The wireless LAN system according to claim 2, wherein if the one or more other wireless LAN relay devices comprises a plurality of other wireless LAN relay devices and at least one of the priority levels of the plurality of other wireless LAN relay devices stored in the priority storing section is not a lowest priority level among number of priority levels employed in the wireless LAN system, the priority setting section sets the priority level of the wireless LAN relay device to be one level lower than the highest priority level of the priority levels stored in the priority storing section.

4. The wireless LAN system according to claim 2, wherein if the one or more other wireless LAN relay devices comprises a single other wireless LAN relay device and the priority level of the single other wireless LAN relay device is not a lowest priority level among number of priority levels employed in the wireless LAN system, the priority setting section sets the priority level of the wireless LAN relay device to be one level lower than the priority level stored in the priority storing section.

5. The wireless LAN system according to claim 2, wherein if the priority levels of all of the one or more other wireless LAN relay devices stored in the priority section are a lowest priority level among number of priority levels employed in the wireless LAN system, the priority setting section sets the priority level of the wireless LAN relay device to be a lowest priority level among number of priority levels employed in the wireless LAN system.

6. The wireless LAN system according to claim 2, wherein
the priority setting section further comprises a station connection determination section for determining whether the wireless LAN relay device is connected as a station to one of the one or more other wireless LAN relay devices using the station interface, when the wired connection determination section determines that the wireless LAN relay device is not wiredly connected to the outer network, and
when the station connection determination section determines that the wireless LAN relay device is connected as a station, the priority setting section ends the priority setting process without setting priority level of the wireless LAN relay device.

7. The wireless LAN system according to claim 2, wherein
the wired connection determination section transmits a DHCP-Discover message to the outer network using the wired communication section, and wherein
when the wired communication section receives a DHCP-Offer message which is a response to the DHCP-Discover message, the wired connection determination section determines that the wireless LAN relay device is wiredly connected to the outer network.

8. The wireless LAN system according to claim 1, wherein the priority transmitting section includes the set priority level into a management frame communicated over the wireless network thereby to transmit the priority level to the one or more other wireless LAN relay devices.

9. The wireless LAN system according to claim 1, wherein
the wireless communication section further includes an authenticated connection section for performing an infrastructure mode-compliant authentication process, based on a request from the wireless LAN relay device to one or more superordinate other wireless LAN relay devices, which have the highest priority level among one or more other wireless LAN relay devices, the one or more other wireless LAN relay devices being present in a range where radio waves of the wireless LAN relay device are reachable, and being communicable with the wireless LAN relay device, and for establishing a connection with the one or more superordinate other wireless LAN relay devices that have been authenticated,
the relaying section relays the packet to the one or more superordinate other wireless LAN relay devices connected by the authenticated connection section.

10. The wireless LAN system according to claim 9, wherein if there are a plurality of the superordinate other wireless LAN relay devices, the authenticated connection section establishes the connection through the authentication with one of the plurality of the superordinate other wireless LAN relay devices that has the highest priority level and that has the highest signal strength.

11. The wireless LAN system according to claim 9, wherein
the wireless communication section further includes a rank setting section for obtaining, from the one or more other wireless LAN relay devices, first BSSID identification information for identifying the one or more other wireless LAN relay devices, and for setting a rank for establishing the connection through the authentication between the wireless LAN relay device and one of the one or more other wireless LAN relay devices, based on the first BSSID and second BSSID, which is stored in the wireless LAN relay device to identify the wireless LAN relay device,
wherein if the priority level set to the wireless LAN relay device is the same as the priority level set to the one or more other wireless LAN relay devices, the authenticated connection section establishes the connection through the authentication with one of the one or more other wireless LAN relay devices based on the rank set by the rank setting section, and
the relaying section performs relaying to the one of the more or more other wireless LAN connection devices with which the connection has been established by the authenticated connection section.

12. The wireless LAN system according to claim 9, wherein
the authenticated connection section is configured to perform exchange of encryption keys for encrypting the packet, and
the relaying section relays through encrypted communication using the encryption keys which are exchanged by the authenticated connection section.

13. The wireless LAN system according to claim 1, wherein
the wireless communication section is configured to perform wireless communication using a plurality of channels, wherein
the priority transmitting section further includes:
a requesting section for transmitting a first probe request having assigned thereto original channel information indicating a channel being originally used, the requesting section transmitting the first probe request by using a channel of the plurality of channels that is different from the originally used channel;
a responding section for transmitting a probe response, upon reception of the first probe request from one of the one or more other wireless LAN relay devices, which probe request from the one of the one or more other wireless LAN relay devices has assigned thereto other wireless LAN relay device channel information, the responding section transmitting the probe response by using the channel indicated by the other wireless LAN relay device channel information assigned to the first probe request from the one of the one or more other wireless LAN relay devices; and
a post-request restoring section for restoring, within a predetermined period of time after transmission of the first probe request having assigned thereto the original channel information, to the originally used channel, wherein
the requesting section successively uses one of the plurality of channels that is different from the originally used channel, each time the requesting section transmits another probe request after the first probe request, until all of the plurality of channels have been used, and wherein the wireless LAN relay device further comprises a waiting control section for controlling the wireless LAN relay device so as to restore to the originally used channel using the post-request restoring section, each time the requesting section transmits the another probe request after the first probe request, and wait at the originally used channel for more than a beacon transmission period during which the wireless LAN relay device transmits a beacon, before transmitting the another probe request.

14. A wireless LAN relay device which performs wireless communication in a wireless network, the wireless LAN relay device comprising:
   a wired communication section for performing wired communication with an outer network;
   a wired connection determination section for determining whether the wireless LAN relay device is wiredly connected to the outer network;
   a wireless communication section, which includes both an access point interface functioning as an access point and a station interface functioning as a station, for performing wireless communication including relaying a packet in the wireless network;
   a priority setting section for setting a priority level of the wireless LAN relay device as a relay destination in a relay path along which the packet travels during transmission through the wireless network to the outer network; and
   a priority storing section for storing priority levels of one or more of the other wireless LAN relay devices, wherein
   the wireless communication section comprises:
      a priority transmitting section for transmitting the priority level of the wireless LAN relay device set by the priority setting section to the one or more other wireless LAN relay devices;
      a priority receiving section for receiving the priority levels of the one or more other wireless LAN relay devices from the one or more other wireless LAN relay devices, and storing the received priority levels in the priority storing section; and
      a relaying section for relaying the packet to one of the one or more other wireless LAN relay devices that has the highest priority level among the priority levels stored in the priority storing section, wherein
      when the wired connection determination section determines that the wireless LAN relay device is wiredly connected to the outer network, the priority setting section sets the priority level of the wireless LAN relay device the highest, and
      when the wired connection determination section determines that the wireless LAN relay device is not wiredly connected to the outer network, the priority setting section sets the priority level of the wireless LAN relay device hierarchically depending on the number of relay points to another wireless LAN relay device connected to the outer network, wherein
   the priority setting section comprises:
      an access point connection determination section for determining whether a station is connected to the access point interface; and
      a communication frequency determination section for determining whether communication frequency between the wireless LAN relay device and the station is more than or equal a predetermined level, when the access point connection determination section determines that the station is connected to the access point interface, wherein
      when the communication frequency determination section determines the communication frequency is more than or equal the predetermined level, the priority setting section ends the priority setting process without setting priority level of the wireless LAN relay device.

15. A non-transitory storage medium having stored therein a program for causing relay of a packet between a wireless LAN relay device, which performs wired communication with an outer network and is capable of relaying a packet in a wireless network, and one or more other wireless LAN relay devices,
   the wireless LAN relay device comprising:
      a wired communication section for performing wired communication with an outer network;
      an access point interface functioning as an access point; and a station interface functioning as a station, the program causing a processor provided to the wireless LAN relay device to perform:
      a wired connection determination function for determining whether the wireless LAN relay device is connected to the outer network;
      a priority setting function for setting a priority level of the wireless LAN relay device as a relay destination in a relay path along which the packet travels during transmission through the wireless network to the outer network;
      a transmitting function for transmitting the set priority level of the one or more other wireless LAN relay devices;
      a receiving function for receiving from the one or more other wireless LAN relay devices, the priority levels of the one or more other wireless LAN relay devices; and
      a relay function for relaying the packet to one of the one or more of the other wireless LAN relay devices that has the highest priority level among the priority levels received by the receiving function, wherein
      when the wired connection determination function determines that the wireless LAN relay device is wiredly connected to the outer network, the priority setting function sets the priority level of the wireless LAN relay device the highest, and
      when the wired connection determination function determines that the wireless LAN relay device is not wiredly connected to the outer network, the priority setting function sets the priority level of the wireless LAN relay device hierarchically depending on the number of relay points to another wireless LAN relay device connected to the outer network, wherein
   the priority setting function comprises:
      an access point connection determination function for determining whether a station is connected to the access point interface; and
      a communication frequency determination function for determining whether communication frequency between the wireless LAN relay device and the station is more than or equal a predetermined level, when the access point connection determination function determines that the station is connected to the access point interface, wherein
      when the communication frequency determination function determines the communication frequency is more than or equal the predetermined level, the priority setting function ends the priority setting process without setting priority level of the wireless LAN relay device.

16. A method for allowing a wireless LAN relay device, which comprises: a wired communication section for performing wired communication with an outer network; an access point interface functioning as an access point; and a station interface functioning as a station, and performs wired communication with an outer network and is configured to relay a packet in a wireless network, to relay the packet to one or more other wireless LAN relay devices, the method comprising:

determining whether the wireless LAN relay device is connected to the outer network;
 setting a priority level of the wireless LAN relay device as a relay destination in a relay path along which the packet travels during transmission through the wireless network to the outer network, the priority level of the wireless LAN relay device being set to be the highest if the wireless LAN relay device is wiredly connected to the outer network, and set to be hierarchically depending on the number of relay points to another wireless LAN relay device connected to the outer network if the wireless LAN relay device is not wiredly connected to the outer network;
 transmitting the set priority level to the one or more other wireless LAN relay devices;
 receiving priority levels of the one or more other wireless LAN relay devices from the one or more other wireless LAN relay devices; and
 relaying the packet to one of the one or more other wireless LAN relay devices that has the highest priority level among the received priority levels, wherein
 in the setting of the priority level of the wireless LAN relay device, the wireless LAN relay device determines whether a station is connected to the access point interface, wherein when the wireless LAN relay device determines that the station is connected to the access point interface, the wireless LAN relay device determines whether communication frequency between the wireless LAN relay device and the station is more than or equal a predetermined level, and wherein
 when the wireless LAN relay device determines the communication frequency is more than or equal the predetermined level, the wireless LAN relay device ends the priority setting process without setting priority level of the wireless LAN relay device.

17. A wireless LAN relay device which performs wireless communication in a wireless network, the wireless LAN relay device comprising:
 a wireless communication section, which includes both an access point interface functioning as an access point and a station interface functioning as a station, for performing wireless communication including relaying a packet in the wireless network directed to an outer network;
 a priority setting section, for setting a priority level of the wireless LAN relay device as a relay destination in a relay path along which the packet travels during transmission through the wireless network, the priority setting section setting the priority level of the wireless LAN relay device to be relatively higher based on the proximity of the wireless LAN relay device to the outer network, and
 a priority storing section for storing a priority level of one or more other wireless LAN relay devices,
 the wireless communication section including:
 a priority transmitting section for transmitting the priority level of the wireless LAN relay device set by the priority setting section to the other wireless LAN relay devices;
 a priority receiving section for receiving the priority levels of the one or more other wireless LAN relay devices from the one or more other wireless LAN relay devices, and storing the received priority level in the priority storing section; and
 a relaying section for relaying the packet to one of the one or more other wireless LAN relay devices that has the highest priority level among the priority levels stored in the priority storing section, wherein
 the priority setting section comprises:
 an access point connection determination section for determining whether a station is connected to the access point interface, and
 a communication frequency determination section for determining whether communication frequency between the wireless LAN relay device and the station is more than or equal a predetermined level, when the access point connection determination section determines that the station is connected to the access point interface, wherein
 when the communication frequency determination section determines the communication frequency is more than or equal the predetermined level, the priority setting section ends the priority setting process without setting priority level of the wireless LAN relay device.

* * * * *